United States Patent
Boutnaru et al.

(10) Patent No.: US 12,367,281 B2
(45) Date of Patent: Jul. 22, 2025

(54) AUTOMATIC MITIGATION OF CORRUPTED OR COMPROMISED COMPUTE RESOURCES

(71) Applicant: GitLab Inc., San Francisco, CA (US)

(72) Inventors: Shlomi Boutnaru, Beer Sheva (IL); Liran Tancman, Beer Sheva (IL); Artem Merkovich, Beer Sheva (IL); Royi Klein, Beer Sheva (IL); Omri Lahav, Beer Sheva (IL); Artum Zolotushko, Beer Sheva (IL); Tal Kopeliovich, Beer Sheva (IL); Yuri Shafet, Beer Sheva (IL); Lior Zur-Lotan, Beer Sheva (IL); Yotam Perkal, Beer Sheva (IL)

(73) Assignee: GitLab Inc., San Francisco, CA (US)

( * ) Notice: Subject to any disclaimer, the term of this patent is extended or adjusted under 35 U.S.C. 154(b) by 382 days.

(21) Appl. No.: 17/426,294

(22) PCT Filed: Feb. 4, 2020

(86) PCT No.: PCT/IB2020/050883
§ 371 (c)(1),
(2) Date: Jul. 28, 2021

(87) PCT Pub. No.: WO2020/161622
PCT Pub. Date: Aug. 13, 2020

(65) Prior Publication Data
US 2021/0390182 A1    Dec. 16, 2021

Related U.S. Application Data

(60) Provisional application No. 62/801,511, filed on Feb. 5, 2019.

(51) Int. Cl.
*G06F 21/56* (2013.01)

(52) U.S. Cl.
CPC .......... *G06F 21/562* (2013.01); *G06F 21/568* (2013.01); *G06F 2221/033* (2013.01)

(58) Field of Classification Search
CPC . G06F 21/562; G06F 21/568; G06F 2221/033
(Continued)

(56) References Cited

U.S. PATENT DOCUMENTS 7,739,517 B2 * 6/2010 Sahita ................. G06F 21/57
713/193
2014/0223560 A1   8/2014 Christodorescu et al.
(Continued)

FOREIGN PATENT DOCUMENTS

CN   108197468 A * 6/2018 .......... G06F 21/552
EP   3903183 A1    11/2021
(Continued)

OTHER PUBLICATIONS

Cache (computing)—Wikipedia, Retrieved from the Internet URL: https://en.wikipedia.org/w/index.php?title=Cache_(computing)&oldid=873555421, Dec. 13, 2018, pp. 1-9.
(Continued)

*Primary Examiner* — Moeen Khan
(74) *Attorney, Agent, or Firm* — Fenwick & West LLP

(57) ABSTRACT

Embodiments described herein are directed to determining whether an application executing on a compute instance has been corrupted or compromised by malicious code. This may achieved by statically analyzing an image file from which the application is based to determine characteristics thereof. Such characteristics are representative of the behavior that is expected to be performed by the application during execution. During execution of the application, runtime characteristics of the application are determined, which are determined based on an analysis of the address space in memory allocated for a computing process of the applica-
(Continued)

tion. The statically-determined characteristics are compared to the determined runtime characteristics to determine discrepancies therebetween. In the event that a discrepancy is found, a determination is made that the application has been compromised or corrupted and an appropriate remedial action is automatically performed.

20 Claims, 23 Drawing Sheets

(58) Field of Classification Search
USPC .......................................................... 726/24
See application file for complete search history.

(56) References Cited

U.S. PATENT DOCUMENTS

| | | | | |
|---|---|---|---|---|
| 2018/0020013 | A1* | 1/2018 | Yoshikawa | G06F 21/56 |
| 2019/0087161 | A1* | 3/2019 | Sathe | H04L 67/12 |
| 2020/0342100 | A1* | 10/2020 | Goldstein | G06F 21/52 |

FOREIGN PATENT DOCUMENTS

| | | | | |
|---|---|---|---|---|
| WO | 2016137579 | A1 | 9/2016 | |
| WO | WO-2017052947 | A1 * | 3/2017 | ........... G06F 21/562 |

OTHER PUBLICATIONS

Hooking—Wikipedia, Retrieved from the Internet URL: https://en.wikipedia.org/w/index.php?title=Hooking&oldid=879634388, Jan. 22, 2019, pp. 1-11.

International Preliminary Report on Patentability received for PCT Application No. PCT/IB2020/050883, mailed on Aug. 19, 2021, 8 pages.

Office Action received for European Patent Application No. 20704606.1, mailed on Jun. 17, 2022, 9 pages.

Liu Yutao et al., "Transparent and Efficient CFI Enforcement with Intel Processor Trace," IEEE International Symposium on High Performance Computer Architecture (HPCA), Feb. 4, 2017, pp. 529-540.

International Search Report and Written Opinion received for PCT Patent Application No. PCT/IB2020/050883, mailed on Apr. 21, 2020, 11 pages.

Israeli Intellectual Property Office, Office Action, Israeli Patent Application No. 285327, Jul. 30, 2024, six pages.

* cited by examiner

AUTOMATIC MITIGATION OF CORRUPTED OR COMPROMISED COMPUTE RESOURCES

CROSS REFERENCE TO RELATED APPLICATION(S)

This application is a U.S. national phase application of PCT/IB2020/050883, filed on Feb. 4, 2020, which claims priority to U.S. Provisional Application Ser. No. 62/801,511, filed on Feb. 5, 2019, the entireties of which are incorporated by reference herein.

BACKGROUND

Organizations, such as businesses, often provide web-based applications and services to their customers. Historically, the applications and services were hosted on servers located "on-premises." However, the trend is shifting to using cloud computing platforms, which offer higher efficiency, greater flexibility, lower costs, and better performance relative to "on-premises" servers. Accordingly, organizations are shifting away from locally maintaining applications, services, and data and migrating to cloud computing platforms. This migration has gained the interest of malicious entities, such as hackers. Hackers may attempt to leverage the massive amount of computing resources provided by such platforms for their own malicious purposes, such as injecting malicious code designed to exploit system vulnerabilities leading to back doors, security breaches, information and data theft, and other potential damages to files and computing systems.

Such malicious code also utilizes compute resources (e.g., processors, memory, storage, network bandwidth, etc.) to carry its malicious activities. Thus, a computing device compromised or corrupted with malicious code might suffer from a drastic reduction in performance. Conventional detection and mitigation techniques require rather lengthy diagnostics and significant downtime of compute resources. As more and more customers rely on cloud computing to maintain its data and/or services, it is imperative for the cloud to run without any hindrance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for determining whether an application executing on a compute instance has been corrupted or compromised by malicious code. The foregoing may be achieved by statically analyzing an image file from which the application is based to determine characteristics of the image file. Such characteristics are representative of the behavior that is expected to be performed by the application that is based on the image file. During execution of the application, runtime characteristics of the application are determined. The runtime characteristics are determined based on an analysis of the address space (e.g., the user space and/or kernel space) in memory allocated for a computing process of the application. The statically-determined characteristics are compared to the determined runtime characteristics (i.e., characteristics determined via dynamic analysis) to determine whether there are any discrepancies therebetween. In the event that a discrepancy is determined, a determination is made that the application has been compromised or corrupted and an appropriate remedial action is automatically performed.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
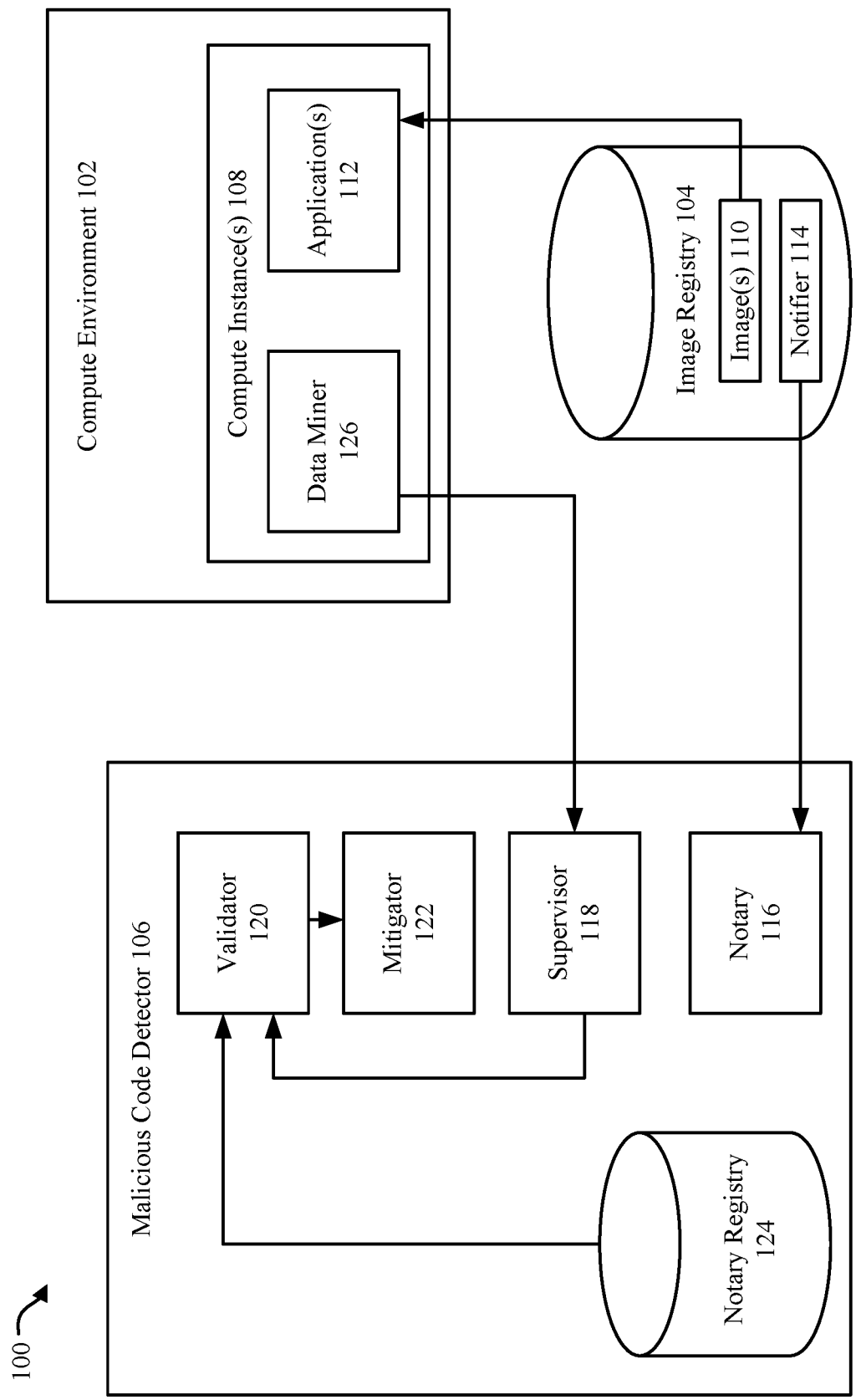
FIG. 1 shows a block diagram of a system for automatically mitigating a corrupted or compromised compute resource in accordance with an embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

For the sake of brevity, embodiments described herein are described in terms of the Linux-based operating systems and the JAVA programming language. However, as should be clear to any person skilled in the art, these are just a few possible embodiments. Similar embodiments may protect practically all kinds of modern operating systems, including Microsoft Windows, and all kinds of programming languages (including interpreter-based languages), including Perl and Python, against a very wide array of malicious-code attacks, whether remote or local.

II. Example Embodiments

Embodiments described herein are directed to determining whether an application executing on a compute instance has been corrupted or compromised by malicious code. The foregoing may be achieved by statically analyzing an image file from which the application is based to determine characteristics of the image file. Such characteristics are representative of the behavior that is expected to be performed by the application that is based on the image file. During execution of the application, runtime characteristics of the application are determined. The runtime characteristics are determined based on an analysis of the address space in memory allocated for a computing process of the application. The statically-determined characteristics are compared to the determined runtime characteristics (i.e., characteristics determined via dynamic analysis) to determine whether there are any discrepancies therebetween. In the event that a discrepancy is determined, a determination is made that the application has been compromised or corrupted and an appropriate remedial action is automatically performed. For instance, the compute instance on which the application may be automatically restarted, and the original image file may be automatically reinstalled.

The techniques described herein advantageously improve the functioning of a computing device. Malicious code is designed to damage or disable computing devices or utilize their resources (e.g., processors, memory, storage, network bandwidth, etc.) for malicious purposes (e.g., obtaining possession of valuable data). Thus, a computing device compromised or corrupted with malicious code suffers from a drastic reduction in performance. By detecting whether a compute resource has been compromised in accordance with the techniques described herein, the appropriate remedial action may be taken, thereby preventing malicious code from detrimentally affecting the compute resource and preventing data leakage and/or corruption.

FIG. 1 shows a block diagram of a system 100 for automatically mitigating a corrupted or compromised compute resource in accordance with an embodiment. As shown in FIG. 1, system 100 includes a compute environment 102, an image registry 104 and a malicious code detector 106. Compute environment 102 may comprise an on-premises environment (e.g., user's home or business), an enterprise environment (an organization or company's network), a datacenter, a private or public cloud-computing environment, etc. Compute environment 102 may comprise one or more compute instances 108. Each of compute instance(s) 108 may comprise a physical computing device, a virtual machine executing on a physical computing device, and/or any type of device comprising one or more processors and/or memories that is configured to process data. Examples of a computing device include but are not limited to, a desktop computer or PC (personal computer), a server, a computing node in a cloud-based environment, an Internet-of-Things (IoT) device, a personal digital assistant (PDA), a laptop computer, a notebook computer, a tablet computer, a netbook, a smart phone, a wearable computing device (e.g., a head-mounted device including smart glasses, a virtual headset, a smart watch, etc.) and/or the like.

Image registry 104 may comprise one or more image(s) 110. Each of image(s) 110 comprises binary(ies), scripts, configurations, executable program code of an application and/or dependencies necessary for application execution. Examples of dependencies include, but are not limited to, system tools, system libraries and settings, runtimes, etc. Each of image(s) 110 are mapped into memory of a compute instance of compute instance(s) 108 on which the corresponding application executes (shown as application(s) 112). Application(s) 112 may be containerized applications (i.e., applications that run via a container). A container is a standard unit of executable software that packages program code of an application and all its dependencies necessary for application execution so that the application runs quickly and reliably from one computing environment to another. Containerized applications may be executed by a container engine stored on and executed by a corresponding compute instance of compute instance(s) 108. An example of a container engine includes, but is not limited to, Docker®, published by Docker®, Inc. Image(s) 110 may be provided to image registry 104 by end-users that develop applications, developers that develop applications for end-users, and/or any other trusted source of executable code. For instance, image(s) 110 may be provided to image registry 104 via a continuous integration (CI) or continuous delivery (CD) pipeline.

Image registry 104 may also comprise a notifier 114. Notifier 114 may be configured to provide a notification to malicious code detector 106 when a new image (e.g., image(s) 110) is added to image registry 104.

Malicious code detector 106 is configured to analyze runtime characteristics of compute instance(s) 108 to determine whether malicious code is executing thereon. In response to detecting such malicious code, malicious code detector 106 may perform one or more actions to mitigate the execution of the malicious code. For instance, as shown in FIG. 1, malicious code detector 106 may comprise a notary 116, a supervisor 118, a validator 120, a mitigator 122, and a notary registry 124.

Notary 116 is configured to receive notifications from notifier 114 that a particular image of image(s) 110 has been added to image registry 104. After being notified of such image(s) 110, notary 116 may request and obtain the image(s) from image registry 104. After obtaining an image, notary 116 may analyze the image to determine various characteristics of its application. The characteristics may be indicative of the behavior and/or operations that the application may perform during runtime thereof. For instance, notary 116 may determine executable segments of the image file, determine a list of packages included in the image file, determine a list of files included in the image file, determine any scripts that are to be executed during runtime of the application, determine one or more commands that are to be executed by the application during runtime thereof, determine which libraries will be dynamically loaded and/or linked, determine which classes or objects will be loaded, determine which domain name system (DNS) addresses will be resolved, etc. The determined characteristics may be stored in notary registry 124. Notary registry 124 may comprise one or more data store(s) (e.g., database(s), memory(ies), storage device(s), etc.). In accordance with an embodiment, notary 116 may utilize static analysis techniques to analyze the image. Additional details regarding the static analysis techniques performed by notary 116 are described below in Subsection B.

Each of compute instance(s) 108 may also comprise a data miner 126. Data miner 126 may be configured to perform a dynamic analysis and collect data associated with application(s) 112 during execution thereof. For example, the data may be runtime characteristics of application(s) 112. Examples of runtime characteristics collected by data miner 126 include, but are not limited to, packages and/or files loaded in memory space allocated for a computing process of the application, functions called by the application, classes or objects loaded by the application, class loaders utilized to load classes or objects, commands executed by the application, DNS addresses resolved by the application, data stored in pages allocated in memory for the application, data stored in one or more data structures allocated for and/or utilized by a computing process of the application (e.g., a stack, a heap, a metaspace, etc.), etc. In accordance with an embodiment, data miner 126 collects data in a periodic fashion (e.g., after expiration of a predetermined timeout). In accordance with another embodiment, data miner 126 collects data based on a triggering event (e.g., when a change is detected in compute instance(s) 108). The collected data is provided to supervisor 118 of malicious code detector 106. Supervisor 118 may be configured to provide the data to validator 120. Additional details regarding data miner 126 will be described below in Subsection A.

Validator 120 may be configured to compare the characteristics determined for an image file (received via notary registry 124) and the runtime characteristics determined for the application corresponding to the image file (e.g., application 112). Validator 120 determines whether the behavior of the application is in accordance with the characteristics determined for its corresponding image. If a determination is made that the behavior is not in accordance with the determined characteristics, validator 120 may provide a notification to mitigator 122 that indicates that compute instance(s) 108 has been compromised or corrupted due to malicious code being executed on compute instance(s) 108. If a determination is made that the behavior is in accordance with the determined characteristics, no remedial action is taken, and execution of application(s) 112 is allowed to continue.

Mitigator 122, upon receiving the notification from validator 120 may perform action(s) to mitigate the malicious code executing on compute instance(s) 108. For instance, mitigator 122 may send a notification to a user (e.g., an administrator). The notification may comprise an e-mail message, a short messaging service (SMS) message, a ticketing message (e.g., sent to an information technology (IT) ticketing application), etc. Mitigator 122 may also send a notification to a particular component of compute environment 102 that causes compute environment 102 to remove and/or recommission the compute instance and/or image file 110, stop, suspend, or restart a compromised process and/or threads thereof of the application, etc. For instance, mitigator 122 may send a notification that indicates to the component of compute environment 102 that the compute instance is unhealthy. In response, the component may perform the appropriate remedial action. The component of compute environment 102 may be configured to manage compute instance(s) 108. In an embodiment in which compute environment 102 is a cloud-based environment, the component may be an orchestrator that automates the deployment and/or scaling of image(s) 110. In such an embodiment, the notification may be sent to the orchestrator, and the orchestrator removes and/or recommissions the problematic compute instance with the original image file stored in image registry 104 and/or stops, suspends, or restarts a compromised process and/or threads thereof. In an embodiment in which the problematic compute instance is a virtual machine, the component may be a virtual machine manager (also known as a "hypervisor") that manages the execution of the virtual machine, and the virtual machine manager may remove and/or recommission the problematic compute instance with the original image file stored in image registry 104 and/or stop, suspend, or restart a compromised process and/or threads thereof. It is noted that the managing components described above are purely exemplary and that other components configured to manage compute instances may be utilized to perform a remedial action.

It is further noted that malicious code detector 106 may be incorporated in compute instance 108 (along with data miner 126) or may be incorporated in another computing device (e.g., a server) remotely located from compute instance 108. In the latter embodiment, malicious code detector 106 may be communicatively coupled to compute environment 102 via one or more networks. The network(s) may comprise network(s) such as local area networks (LANs), wide area networks (WANs), enterprise networks, the Internet, etc., and may include one or more of wired and/or wireless portions.

A. Data Miner Embodiments

Figure 2:
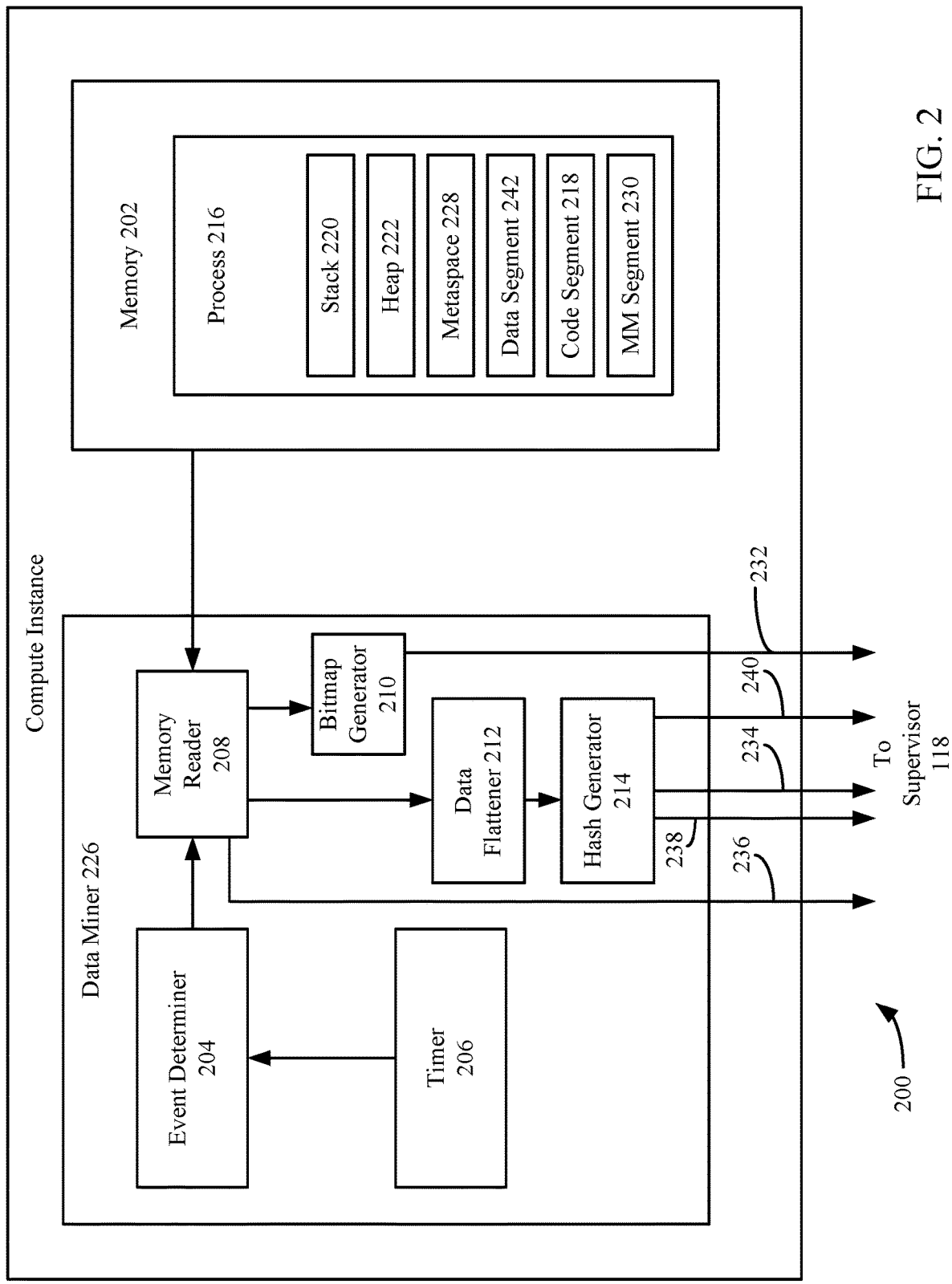
FIG. 2 shows a block diagram of a compute instance in accordance with an embodiment.

FIG. 2 is a block diagram of a compute instance 200 in accordance with an embodiment. Compute instance 200 is an example of compute instance 108, as described above with reference to FIG. 1. As shown in FIG. 2, compute instance 200 comprises a data miner 226 and a memory 202 communicatively coupled thereto. Data miner 226 is an example of data miner 126, as described above with reference to FIG. 1. As also shown in FIG. 2, data miner 226 comprises an event determiner 204, a timer 206, a memory reader 208, a bitmap generator 210, a data flattener 212, and a hash generator 214. As further shown in FIG. 2, an address space for a process 216 of an application (e.g., application 112, as shown in FIG. 1) has been allocated in memory 602. Process 216 represents a running instance of an application corresponding to an image (e.g., the application may be included in an image (e.g., image 110). The operating system (not shown) executing on compute instance 200 may allocate a particular number of pages in memory 202 for process 216. The address space is allocated and initialized when loading the application (i.e., when its corresponding image file is mapped into memory 202). The address space comprises a plurality of regions that store various data structures and segments allocated and/or utilized by the application. For example, a first region may store a code segment 218 for process 216, a second region may store a stack 220 allocated for process 216, a third region may store a heap 222 allocated for process 216, a fourth region may store a data segment 242, a fifth region may store a metaspace 228 associated with process 216, and a sixth region may store a memory mapping segment 230.

Stack 220 may comprise a plurality of stack frames, one for each function called by the application. Each stack frame is allocated when a function is called and is de-allocated when the function returns. Each stack frame may store arguments for a function, local variables utilized for the function and the return value of the function, although it is noted that some of these features (e.g., the arguments for a function) may not be included in stack 220 depending on the architecture of the processor of compute instance 200. Heap 222 is a region of memory 202 that is managed by process 216 for on-the-fly memory allocation. Heap 222 stores variables whose memory requirements are not known at compile time (i.e., dynamically allocated variables). Code segment 218 stores the compiled program or application. Data segment 242 is a region of memory 202 that may store initialized global and static variables. Memory mapping segment 230 may comprise file and/or libraries that are mapped into memory 202. Metaspace 228 stores loaded class metadata and/or static content (such as static methods, primitive variables, and references to the static objects, and/or data about bytecode, names, and just-in-time (JIT) information). It is noted that certain regions are application-specific. For instance, Java-based applications may comprise metaspace 228, while other types of applications may not.

Event determiner 204 may be configured to determine an event that causes data miner 226 to obtain runtime characteristics of an application executing on compute instance 200. Examples of events include, but are not limited to process creation/execution, package installations, detection of command executions in a Docker container (e.g., "docker exec/run), certain network events, etc. Such events may be detected by hooking certain functions of the operating system that are configured to perform such operations. The event may also be an expiration of a predetermined time period. For instance, timer 206 may be configured to provide an event notification to event determiner 204 after expiration of the predetermined time period. Upon expiration of the event, event determiner 204 may determine whether a process has been created or is executing (e.g., by executing the 'ps' command or via other trigger-based mechanisms, such as, but not limited to extended Berkeley Packet Filter (eBPF) monitoring, tracepoints, etc.).

In accordance with an embodiment, event determiner 204 is configured to detect events by hooking certain events and/or functions of the operating system (not shown) from which certain events originate. Event determiner 204 may subscribe to the provider of such events (e.g., the operating system). This enables for a significant reduction in inter process I/O, thereby allowing event determiner 204 to efficiently handle a massive flux of events. For example, event determiner 204 may subscribe to get data from an exec provider, which may possess the relevant information required to detect an event. By doing so, it is not required to perform any additional processing by event determiner 204 to determine whether an event occurred. Instead, event determiner 204 obtained the relevant data from an entity that has already made this determination. The foregoing techniques also allow for filtering of events by a certain criterion. For example, certain process data (e.g., data associated with a particular irrelevant process ID) or process data by a particular executable path may be ignored or dropped. Event determiner 204 may operate in accordance with two modes of operation. The first mode may be a stream-based mode, in which every time that a new event arrives with the required (subscribed data), a callback is executed, and the required data is provided. The second mode may be a state-based mode. In this mode, when a change is detected in compute instance 200 (e.g., creation of a process), the callback is executed, and the required data is provided to event determiner 204. The providers of such events may comprise an application programming interface (API) (e.g., a get_events( ) API) that is accessible by event programmer 204 on demand.

In response to determining an event, event determiner 204 may provide a command to memory reader 208. Memory reader 208 may be configured to read data from the user space allocated for process 216 of memory 202 responsive to receiving the command. For example, memory reader 208 may obtain one or more processes (e.g., process 216) that are currently executing via the command output of executing the 'ps' output or via other trigger-based mechanisms, such as, but not limited to eBPF monitoring, tracepoints, etc. For instance, memory reader 208 may obtain the process id(s) of such processes. Memory reader 208 may then execute one or more commands to obtain the memory mappings of the structures and segments of memory (i.e., stack 220, heap 222, metaspace 228, data segment 242, code segment 218 and/or memory mapping segment 230), obtain the command line used to execute process 216, and/or obtain the full path of the executable file of the running process (e.g., process 216). For example, memory reader 208 may issue a '/proc/<PID>/maps' command to obtain a file of the memory mappings, may issue a '/proc/<PID>/cmdline' command to obtain the command line, and/or issue a 'proc/<PID>/exec' to obtain the full path (where <PID> represents the process ID obtained via the 'ps' command or via other trigger-based mechanisms, such as, but not limited to eBPF monitoring, tracepoints, etc.). The foregoing may be utilized to obtain runtime characteristics of process 216. Such characteristics include, but are not limited to, the contents of executable memory allocated for a computing process of the application, functions called by the application, classes or objects loaded by the application, class loaders utilized to load classes or objects, commands executed by the application, DNS addresses resolved by the application, data stored in pages allocated in memory for the application, data stored in one or more data structures allocated for and/or utilized by a computing process of the application (e.g., a stack, a heap, a metaspace, etc.), the packages, files, libraries and/or scripts loaded for application during execution, etc. Such information (shown as runtime characteristics 236) may be provided to supervisor 118, as described above with reference to FIG. 1.

Certain runtime characteristics (e.g., the contents of executable memory, such as code segment 218) are only loaded in certain pages of memory 202 allocated for process 216. In accordance with an embodiment, data miner 226 may be configured to provide a bitmap to supervisor 118 that specifies which pages of memory 202 have the contents of executable memory loaded therein. For instance, memory reader 208 may provide an indication to bitmap generator 210 that specifies which pages have the contents of executable memory loaded in them. Bitmap generator 210 may generate a bitmap 232 specifying which pages include such runtime characteristics. Bitmap 232 may be a vector of indexes, where each index represents a particular page allocated for process 218. For each page in which such runtime characteristics are loaded, its corresponding index may specify a value of '1', and for each page in which such runtime characteristics are not loaded, its corresponding index may specify a value of '0'. For instance, a bitmap of "<1,1,0,1,0,0>" may indicate that pages 1, 2, and 4 are loaded for such runtime characteristics. As will be described below, validator 120 (as shown in FIG. 1) may utilize bitmap 232 to determine which executable sections should be analyzed with respect to an image file. The foregoing advantageously only provides information about memory regions in which relevant data is loaded, rather than providing information about the entire memory, thereby reducing the amount of processing performed by malicious code detector 106, thereby improving the function of the computing device on which malicious code detector 106 executes. Examples of contents of executable memory include the contents of code segment 218, any shared libraries specified in a header section, etc.

The data located at such pages may be flattened and hashed before being sent to supervisor 118. For instance, the contents of executable memory may be provided to data flattener 212. Data flattener 212 may flatten the data (e.g., by storing such data in a single file or data structure). The flattened data may be provided to hash generator 214.

Hash generator 214 may generate a hash 234 of the flattened data. The flattened sections may be hashed in accordance with a hash function (e.g., MD5, SHA-1, SHA-256, BLAKE, etc.).

Data miner 226 provides bitmap 232 and hash 234 to supervisor 118, as described above with reference to FIG. 1. The foregoing techniques advantageously reduce the amount of data that is required to be transmitted to supervisor 118, thereby reducing the bandwidth required to transmit such data by data miner 226 and receive such data my malicious code detector 106, thereby improving the functioning of the computing device(s) on which data miner 226 and malicious code detector 106 execute. It is noted that other runtime characteristics described herein may be represented via a hash in addition to the content of executable memory. For example, hash generator 214 may also generate a hash 238 for files, packages and/or scripts loaded for process 218. Still further, hash generator 214 may also generate a hash 240 for each class loaded into memory 202 for process 216.

Figure 3:
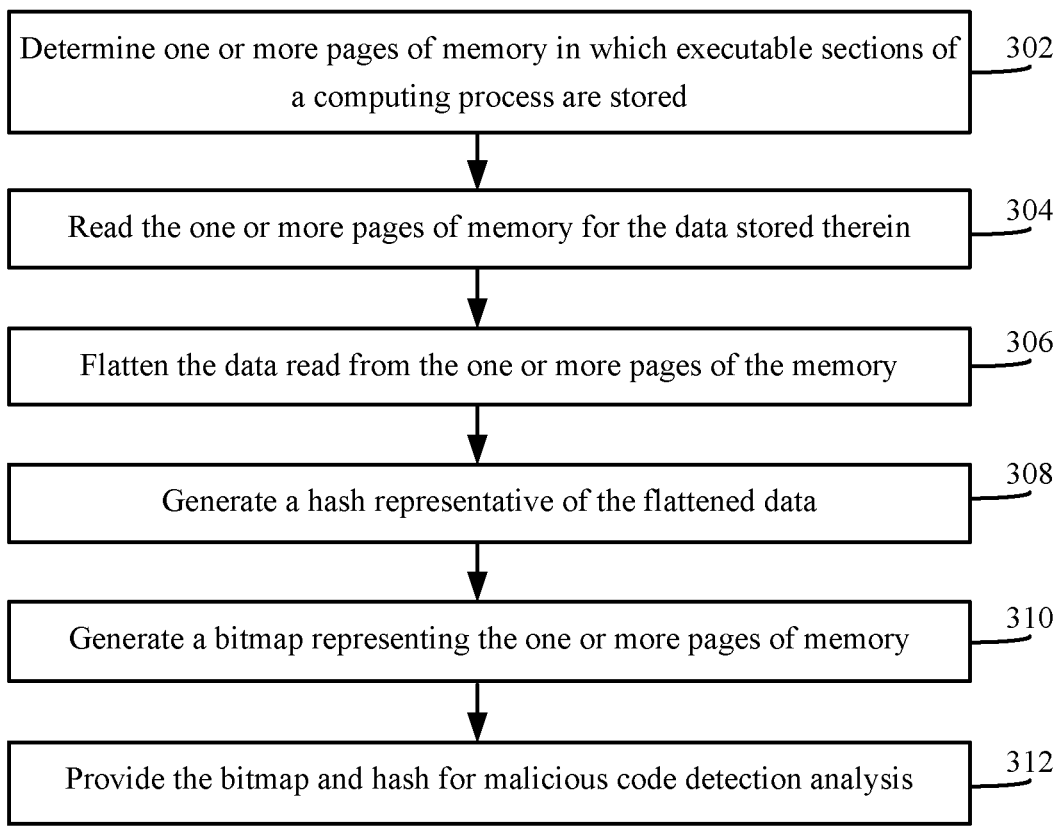
FIG. 3 shows a flowchart of a method for obtaining runtime characteristics of a computing process in accordance with an embodiment.

Accordingly, data miner 226 may be configured to obtain runtime characteristics of a computing process in many ways. For example, FIG. 3 shows a flowchart 300 of a method for obtaining runtime characteristics of a computing process, according to an example embodiment. In an embodiment, flowchart 300 may be implemented by data miner 226, as shown in FIG. 2. Accordingly, flowchart 300 will be described with continued reference to FIG. 2. Other structural and operational embodiments will be apparent to persons skilled in the relevant art(s) based on the following discussion regarding flowchart 300 and data miner 226 of FIG. 2.

Flowchart 300 of FIG. 3 begins with step 302. In step 302, one or more pages of memory in which executable sections of a computing process are stored are determined. For example, with reference to FIG. 2, memory reader 208 may determine one or more pages of memory 202 in which executable sections (e.g., code segment 218) of computing process 216 are stored.

In step 304, the one or more pages of memory are read for the data stored in. For example, with reference to FIG. 2, memory reader 208 reads the one or more pages of memory 202.

In step 306, the data read from the one or more pages of the memory are flattened. For example, with reference to FIG. 2, data flattener 212 flattens the data read from the one or more pages of memory 202.

In step 308, a hash representative of the flattened data is generated. For example, with reference to FIG. 2, hash generator 214 generates a hash 234 representative of the flattened data.

In step 310, a bitmap representing the one or more pages of memory is generated. For example, with reference to FIG. 2, bitmap generator 210 generates a bitmap 232 representing the one or more pages of memory 202.

In step 312, the bitmap and the hash are provided for malicious code detection analysis. For example, with reference to FIG. 2, bitmap 232 and hash 234 are provided for malicious code detection (e.g., to supervisor 118 of malicious code detector 106, as described above with reference to FIG. 1).

B. Notary Embodiments

Figure 4:
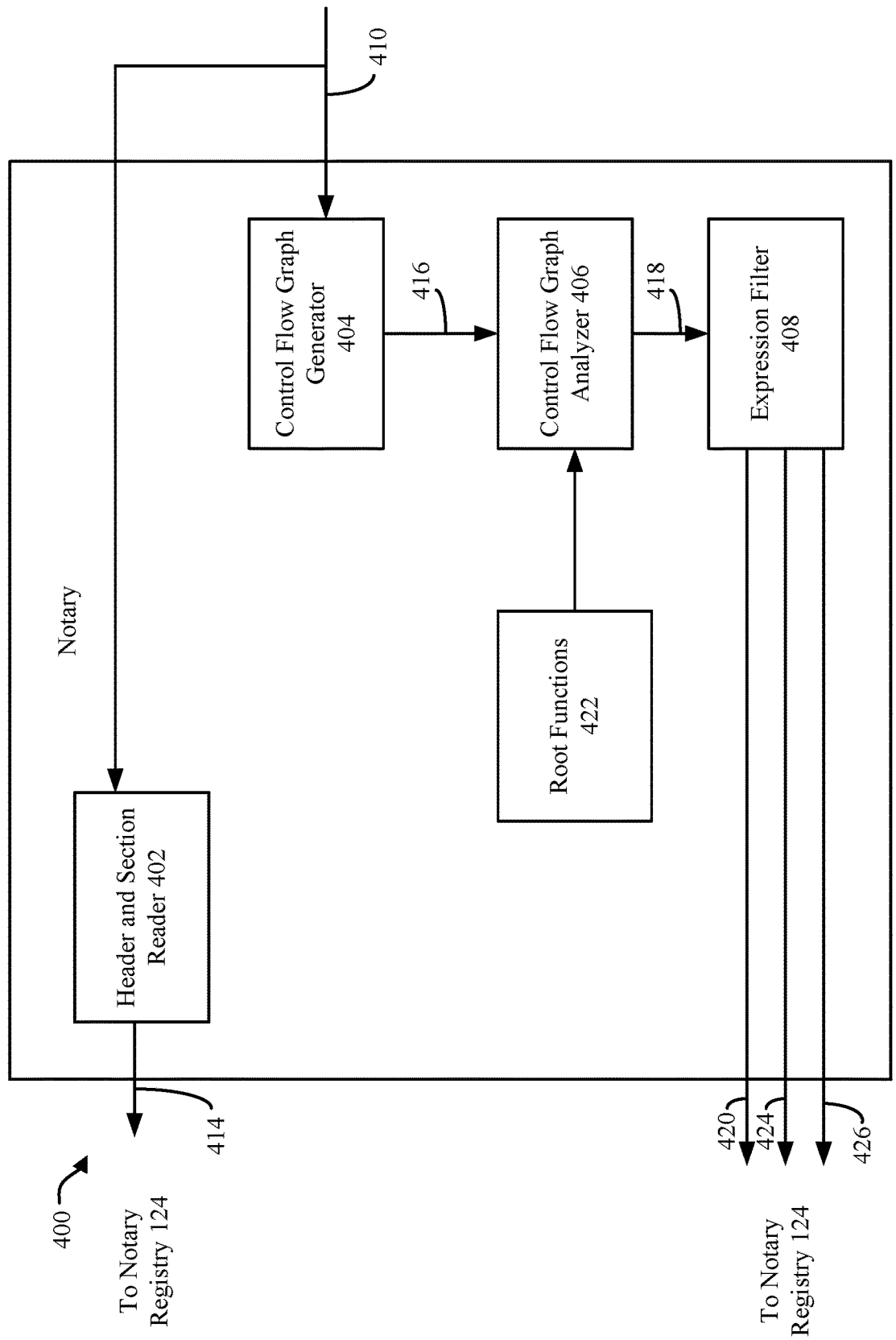
FIG. 4 shows a block diagram of a notary in accordance with an example embodiment.

FIG. 4 is a block diagram of a notary 400 in accordance with an example embodiment. Notary 400 is an example of notary 116, as described above with reference to FIG. 1. As shown in FIG. 4, notary 400 comprises a header and section reader 402, a control flow graph generator 404, a control flow graph analyzer 406, and an expression filter 408.

Notary 400 may be configured to statically analyze image file(s) to determine runtime characteristics, identify vulnerabilities, and/or configurations thereof. The image file(s) may be received from an image registry (e.g., image registry 124, as described in FIG. 1). As shown in FIG. 4, notary 400 receives an image file 410, which is an example of image(s) 110, as described above with reference to FIG. 1. Header and section reader 402 may be configured to read the program and/or section headers and/or one or more sections of image file 410. For instance, in an embodiment in which image file 410 is formatted in accordance with an executable and linkable format (also known as the ELF format), header and section reader 402 may be configured to read the ELF header of image file 410 and one or more sections of image file 410. Examples of section(s) include a ".text" section, a ".data" section a ".rodata" section, etc. The ".text" section may comprise the machine code of the compiled program. The ".rodata" section may comprise read-only data, such as format strings and jump tables. The ".data" section may comprise initialized global variables (e.g., local variables maintained at run time on the stack). It is noted that image file 410 may be of another format, such as, but not limited to a Portable Executable (PE) (as utilized by Microsoft Windows), Mach-O (as used by OS X based operating systems), etc., and that the embodiments described herein are not so limited.

Header and section reader 402 may analyze the header(s) and/or section(s) of image file 412 to determine the packages and/or files that are loadable during execution of the application, which libraries that are dynamically-linkable during execution of the application, which executable files are executable during execution of the application, which class loaders are going to load classes, and/or the contents of executable sections of image file 412. The determined packages/files, libraries and/or executable files, class loaders, and/or contents of the executable sections of image file 410 (shown as header and section-based characteristics 414) information may be stored in the notary registry (e.g., notary registry 124, as shown in FIG. 1). Notary registry 124 may maintain a mapping between each image file analyzed and the characteristics determined therefor via the static analysis performed by notary 400.

Notary 400 may also be configured to determine which libraries and/or classes are dynamically loadable during execution of the application, which commands are executable during execution, and which domain name server (DNS) addresses are resolvable during execution of the application. For example, control flow graph generator 404 may be configured to generate a control flow graph 416 based on image file 410. Control flow graph 416 may represent a control flow during execution of the application corresponding to image file 410. For example, control flow graph 416 may represent all possible paths that might be traversed through an application during its execution. Control flow graph 416 may be graphically represented with nodes and edges coupling the nodes. Each node in the graph may represent basic blocks of an application (e.g., a line of code). Each edge may represent a control flow path between the nodes coupled thereto.

Once control flow graph 416 is generated for image file 410, control flow analyzer 406 may analyze control flow graph 416 to determine whether any nodes correspond to function calls that are configured to load classes, execute commands, and/or resolve DNS addresses. For instance, control flow graph analyzer 406 may receive, as inputs, a list of functions that are known to perform such functions (herein referred to and shown as root functions 422). Root functions 422 may be inputted via a file specifying the root functions. Examples of root functions 422 that load classes include, but are not limited to, "java.lang.Class<T>.forName" (where T represents the type of the class modeled by a Class object). Examples of root functions 422 that execute commands, include, but are not limited to, "java.lang.Runtime.exec" and "java.lang.ProcessBuilder.start". Examples of root functions 522 that resolve DNS addresses, include, but are not limited to, "java.net.InetAddress.getAllByName", "java.net.InetAddress.getByAddress," and "java.net.InetAddress.getByName." It is noted that while the embodiments described above are directed to Java classes, root functions 422 may also specify classes associated with other programming languages.

Control flow graph analyzer 406 traverses control flow graph 416 to determine whether any root functions 412 are included therein. For each root function found, control flow graph analyzer 406 determines the input to such a function. Root functions may receive one or more strings as inputs. Control flow graph analyzer 406 traces control flow graph 416 to determine a node that provides such string(s) as inputs to the found root function. Control flow graph analyzer 406 continues to trace control flow graph 416 backwards until it reaches a node representative of user input, a node that provides a string as an input that is stored in a file, or a node corresponding to an environment variable storing a string. The foregoing process recreates the string building process which forms the string that is inputted into the root function. For each root function found in control flow graph 416, control flow graph analyzer 406 generates a regular expression 418 representative of the string built for that root function using the string building process. For nodes representative of user input, the corresponding string cannot be determined as user input is only provided during execution of the application. Thus, a wildcard (e.g., is used to represent such a string in the regular expression. For nodes that provide strings via a file, control flow analyzer 406 may open the file specified by the node and read the file to determine the string stored therein. For nodes representative of environment variable, control flow graph analyzer 406 searches image file 410 for the environment variable to determine where this environment variable is being set with a string.

Expression filter 408 may be configured to reduce the number of regular expressions 418 by applying regular expressions 418 to image file 410. By doing so, a list of classes 420 that will be loadable during execution, a list of commands 424 that are executable during execution, and a list of DNS addresses 426 that are resolvable during execution are filtered out. List of classes 420, list of commands 424, and list of DNS addresses 426 are stored in the notary registry (e.g., notary registry 124, as described above with reference to FIG. 1).

Figure 5:
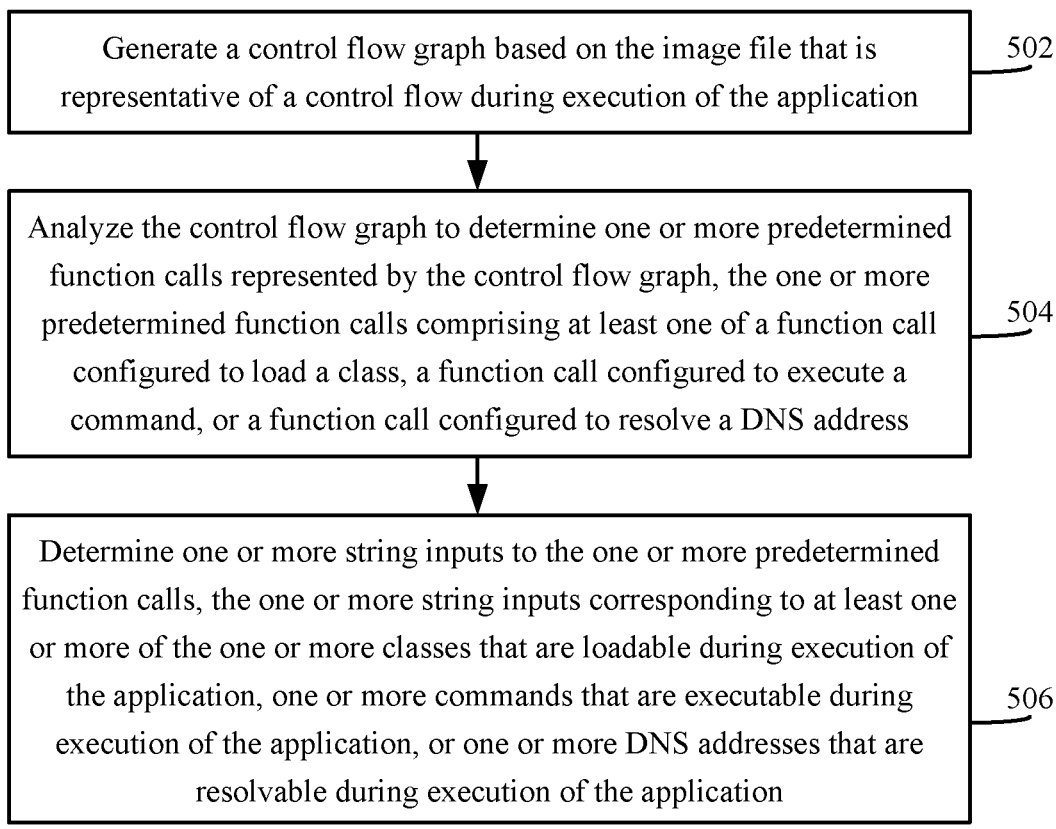
FIG. 5 shows a flowchart of a method for obtaining characteristics of an image file in accordance with an example embodiment.

Accordingly, notary 400 may be configured to obtain characteristics of an image file in many ways. For example, FIG. 5 shows a flowchart 500 of a method for obtaining characteristics of an image file, according to an example embodiment. In an embodiment, flowchart 500 may be implemented by notary 400, as shown in FIG. 4. Accordingly, flowchart 500 will be described with continued reference to FIG. 4. Other structural and operational embodiments will be apparent to persons skilled in the relevant art(s) based on the following discussion regarding flowchart 500 and notary 400 of FIG. 4.

Flowchart 500 of FIG. 5 begins with step 502. In step 502, a control flow graph is generated based on an image file that is representative of a control flow during execution of an application. For example, with reference to FIG. 4, control flow graph generator 404 generates a control flow graph 416 based on image file 410 that is representative of a control flow during execution of an application (e.g., application 112, as shown in FIG. 1.) corresponding to image file 410.

In step 504, the control flow graph is analyzed to determine one or more predetermined function calls represented by the control flow graph. The one or more predetermined function calls comprise at least one of a function call configured to load a class, a function call configured to execute a command, or a function call configured to resolve a DNS address. For example, with reference to FIG. 4, control flow graph analyzer 406 searches for nodes in control flow graph 416 corresponding to such functions. The predetermined functions may be specified by root functions 422.

In step 506, one or more string inputs to the one or more predetermined function calls are determined. The one or more string inputs correspond to at least one or more of the one or more classes that are loadable during execution of the application, one or more commands that are executable during execution of the application, or one or more DNS addresses that are resolvable during execution of the application. For example, with reference to FIG. 4, control flow graph analyzer 406 may determine regular expressions 418 corresponding to the string input(s) to the predetermined function calls. Expression filter 408 may apply regular expressions 418 to image file 410 to determine the list of classes 420 that are loadable during execution of the application, the list of commands 424 that are executable during execution of the application, and the list of DNS addresses 426 that are resolvable during execution of the application.

C. Validator Embodiments

Figure 6:
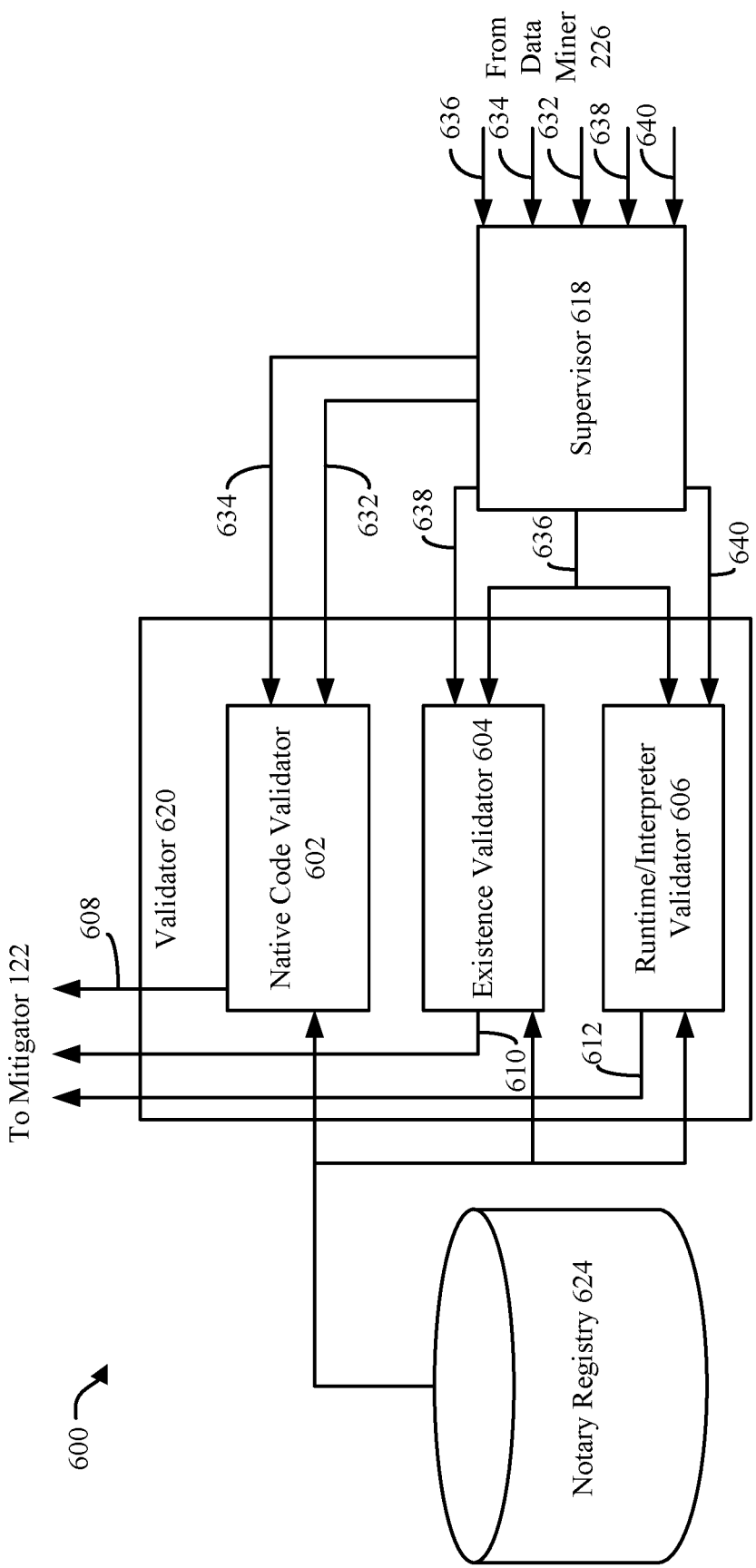
FIG. 6 shows a block diagram of a system for validating an application in accordance with an example embodiment.

FIG. 6 is a block diagram of a system 600 for validating an application in accordance with an example embodiment. System 600 comprises a validator 620, supervisor 618, and notary registry 624. Validator 620, supervisor 618, and notary registry 624 are examples of validator 120, supervisor 118, and notary registry 124, as respectively described above with reference to FIG. 1. As shown in FIG. 6, validator 620 comprises a native code validator 602, an existence validator 604, and an runtime/interpreter validator 606.

Supervisor 618 may be configured to receive runtime characteristics determined by a data miner (e.g., data miner 226). Examples of runtime characteristics include, but are not limited to, a bitmap 632, a hash 634, runtime characteristics 636, one or more hashes 638, and one or more hash(es) 640. Bitmap 632 is an example of bitmap 632, hash 634 is an example of hash 234, runtime characteristics 636 is an example of runtime characteristics 236, hash(es) 638 are examples of hash(es) 238, and hash(es) 640 are examples of hash(es) 240, as respectively described above with reference to FIG. 2. Supervisor 618 provides bitmap 232 and hash 634 to native code validator 602, provides runtime characteristics 634 and hash(es) 638 to existence validator 604, and provides runtime characteristics 634 to runtime/interpreter validator 606.

Native code validator 602 may be configured to receive bitmap 632 and hash 634 from supervisor 618. Bitmap 732 may comprise a representation of all the pages that are loaded in the memory space in which contents of executable memory are located. Hash 634 is a hash of a flattened version of the contents. Native code validator 602 reads bitmap 608 to determine which pages of the associated image file should be loaded from notary registry 624. Native code validator 602 reads and flattens the contents located those pages in a similar manner as performed by data miner 226 and performs a hash function on the flattened contents. The hash function is the same hash function performed by data miner 226. Native code validator 602 compares the generated hash with hash 634. If the generated hash and hash 634 are the same, native code validator 602 determines that the contents of executable memory loaded in the process' memory space are valid, and no remedial action is taken. However, if the generated hash and hash 634 are different, native code validator 602 may provide a notification 608 that indicates that the process' executable memory space is invalid or compromised. Notification 608 is provided to mitigator 122 (as described above with reference to FIG. 1).

Figure 7:
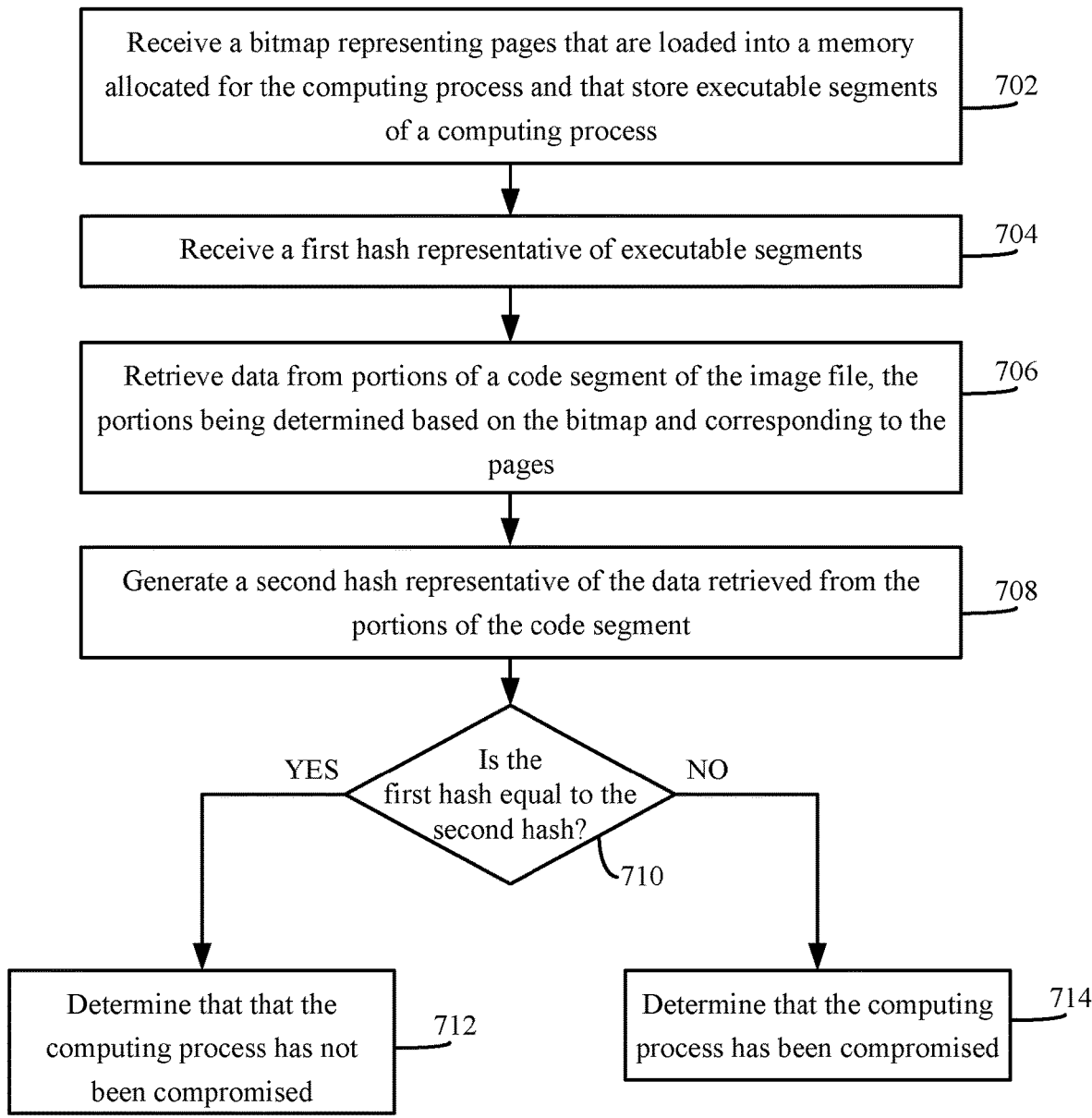
FIG. 7 shows a flowchart of a method for validating executable memory allocated for a computing process, according to an example embodiment.

Accordingly, native code validator 602 may be configured to validate the executable memory allocated for a computing process in many ways. For example, FIG. 7 shows a flowchart 700 of a method for validating executable memory allocated for a computing process, according to an example embodiment. In an embodiment, flowchart 700 may be implemented by native code validator 602, as shown in FIG. 6. Accordingly, flowchart 700 will be described with continued reference to FIG. 6. Other structural and operational embodiments will be apparent to persons skilled in the relevant art(s) based on the following discussion regarding flowchart 700 and native code validator 602 of FIG. 6.

Flowchart 700 of FIG. 7 begins with step 702. In step 702, a bitmap representing pages that are loaded into a memory allocated for the computing process and that store executable segments of the computing process is received. For example, with reference to FIG. 6, native code validator 602 receives bitmap 632 from supervisor 618, which receives bitmap 632 from a data miner (e.g., data miner 226). Bitmap 623 may represent the pages of a memory allocated for a computing process (e.g., memory 202 of process 216, as shown in FIG. 2) that are loaded for code segment 218.

In step 704, a first hash representative of the executable segments is received. For example, with reference to FIG. 6, native code validator 602 receives hash 634 from supervisor 618, which receives hash 634 from a data miner (e.g., data miner 226). Hash 634 may represent a hash of the contents of code segment 218, as shown in FIG. 2.

In step 706, data from portions of a code segment of the image file is retrieved, the portions being determined based on the bitmap and corresponding to the pages. For instance, with reference to FIG. 6, native code validator 602 retrieves portions of a code segment of the image file (corresponding to the computing process) that were previously collected and stored in notary registry 624, for example, by notary 400, as shown in FIG. 4. The portions of code segment that are retrieved correspond to the pages specified by bitmap 632.

In step 708, a second hash representative of the data retrieved from the portions of the code segment is generated. For example, with reference to FIG. 6, native code validator 602 generates a second hash representative of the data retrieved from the portions of the code segment.

In step 710, a determination is made as to whether the first hash is equal to the second hash. If a determination is made that the first hash is equal to the second hash, flow continues to step 712. Otherwise, flow continues to step 714. For example, with reference to FIG. 6, native code validator 602 determines whether the first hash (i.e., hash 634) is equal to the second hash.

In step 712, a determination is made that the computing process has not been compromised. For example, with reference to FIG. 6, native code validator 602 determines that the computing process has not been compromised.

In step 714, a determination is made that the computing process has been compromised. For example, with reference to FIG. 6, native code validator 602 determines that the computing process has been compromised. Native code validator 602 may provide notification 608 responsive to determining that the computing process has been compromised.

Referring again to FIG. 6, existence validator 604 may be configured to validate whether packages, files, and/or scripts in an interpreter's memory space correspond to the files, packages and/or scripts of its corresponding image file and that the files, packages and/or scripts were not modified on disk or in memory. Existence validator 604 may receive a list of packages, files, and/or scripts that are loaded for a computing process (via runtime characteristics 636) and/or hash(es) 638 each representative of the packages, files, and/or scripts specified in the list. Existence validator 604 reads the list to determine which packages, files, and/or scripts of the associated image file should be retrieved form notary registry 624. Existence validator 604 may generate hash(es) for the retrieved package(s), file(s), and/or scripts using a hash function. The hash function is the same hash function performed by the hash generator 214, as described in FIG. 2. Existence validator 604 compares the generated hash(es) with hash(es) 638. If the generated hash(es) and hash(es) 638 are equal, existence validator 640 determines that the packages, files, and/or scripts loaded in the process' memory space are all valid and not compromised (i.e., the packages, files, and/or scripts are sourced from its image file), and no further action is taken. However, if the generated hash(es) and hash(es) 638 are not equal, existence validator 604 may provide a notification 610 that indicates that the process' memory space comprises invalid or compromised packages, files, and/or scripts. Notification 610 is provided to mitigator 122, as shown in FIG. 1).

Figure 8:
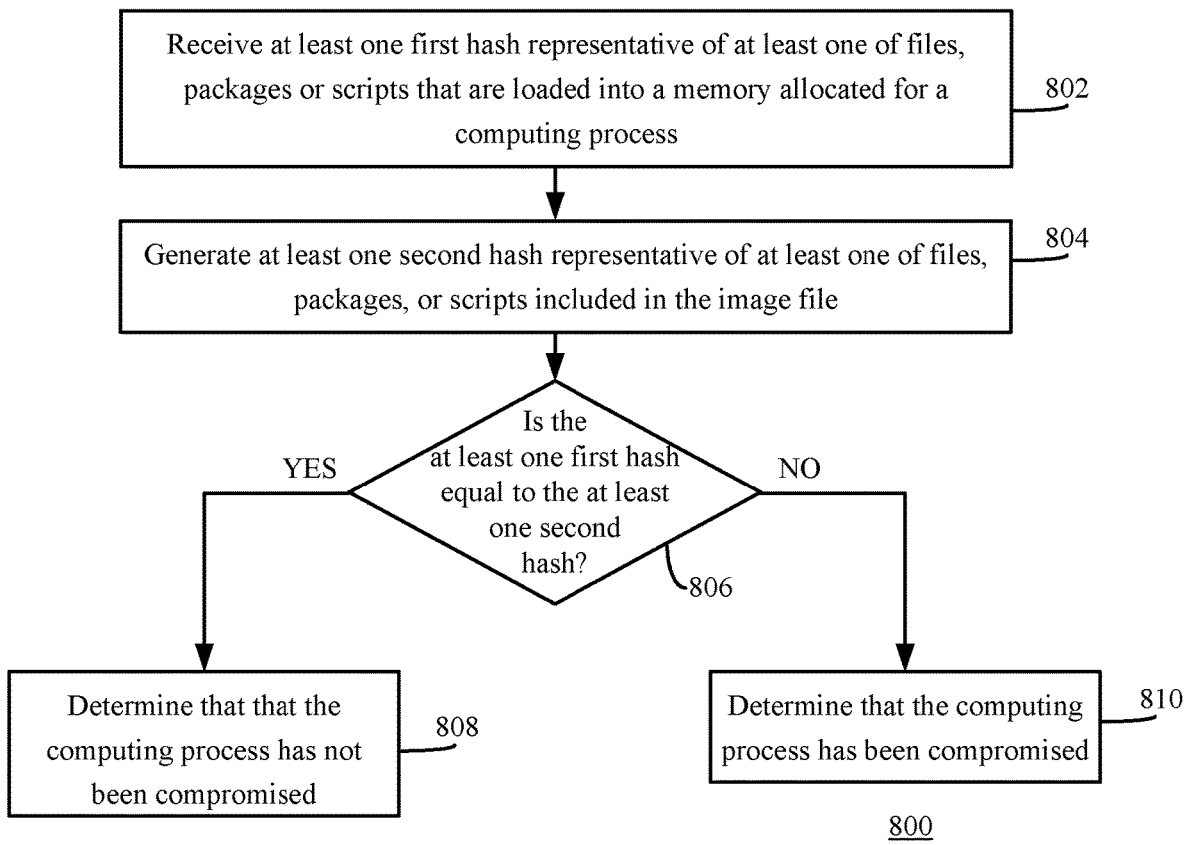
FIG. 8 shows a flowchart of a method for validating packages, files, and/or scripts loaded for a computing process in accordance with an example embodiment.

Accordingly, existence validator 604 may be configured to validate the packages, files, and/or scripts loaded for a computing process in many ways. For example, FIG. 8 shows a flowchart 800 of a method for validating packages, files, and/or scripts loaded for a computing process, according to an example embodiment. In an embodiment, flowchart 800 may be implemented by existence validator 604, as shown in FIG. 6. Accordingly, flowchart 800 will be described with continued reference to FIG. 6. Other structural and operational embodiments will be apparent to persons skilled in the relevant art(s) based on the following discussion regarding flowchart 800 and existence validator 604 of FIG. 6.

Flowchart 800 of FIG. 8 begins with step 802. In step 802, at least one first hash representative of at least one of files, packages or scripts that are loaded into a memory allocated for a computing process is received. For example, with reference to FIG. 6, existence validator 604 receives hash(es) 638 representative of files, packages, or scripts loaded into a memory allocated for a computing process (e.g., memory 202 of process 216, as shown in FIG. 2) from supervisor 618, which receives hash(es) 638 from a data miner (e.g., data miner 226).

In step 804, at least one second hash representative of at least one of files, packages, or scripts included in the image file (the image file corresponding to the computing process) is generated. For example, with reference to FIG. 6, existence validator 604 generates the at least one second hash representative of at least one of files, packages, or scripts included in the image file that are stored in notary registry 624.

In step 806, a determination is made as to whether the at least one first hash is equal to the at least one second hash. If a determination is made that the at least one first hash is equal to the at least one second hash, flow continues to step 808. Otherwise, flow continues to step 810. For example, with reference to FIG. 6, existence validator 604 determines whether the at least one first hash (i.e., hash 638) is equal to the at least one second hash.

In step 808, a determination is made that the computing process has not been compromised. For example, with reference to FIG. 6, existence validator 604 determines that the computing process has not been compromised.

In step 810, a determination is made that the computing process has been compromised. For example, with reference to FIG. 6, existence validator 604 determines that the computing process has been compromised. Existence validator 602 may provide notification 610 responsive to determining that the computing process has been compromised.

Referring again to FIG. 6, runtime/interpreter validator 606 may be configured to validate whether classes loaded for the computing process, commands executed by the computing process, and/or DNS addresses resolved by the computing process are valid. The DNS addresses may also be a chain of DNS resolved addresses that start with a hostname specified by the image. The hostname may be received from a central repository, and runtime/interpreter validator 606 may approve all hostnames which are read from the approved repository. The hostnames from such a repository may also be digitally signed. Runtime/interpreter validator may receive a list of classes loaded by the computing process, a list of commands executed by the computing process, and/or a list of DNS addresses resolved by the computing process (via runtime characteristics 636) from supervisor 618, which receives the lists from a data miner (e.g., data miner 226). Runtime/interpreter validator 606 may also retrieve a list of classes that are loadable by the computing process, a list of commands executable by the computing process, and/or a list of DNS addresses resolvable by the computing process from notary registry 624, as determined by notary 400, as described above with reference to FIG. 4.

If the lists of classes, lists of commands, and/or lists of DNS addresses do not match, validator 620 determines that the computing process is compromised. Runtime/interpreter validator 606 may provide a notification 612 that indicates the classes, commands and/or DNS addresses that are invalid. Notification 612 is provided to mitigator 122 (as described above with reference to FIG. 1). However, if all the lists match, then runtime/interpreter validator 606 determines that the computing process is not compromised.

For each class determined to be valid, runtime/interpreter validator 706 may determine whether the class loader that loaded that class is valid and also verify whether the loaded class has a valid structure. To determine whether the class has a proper structure, runtime/interpreter validator 606 may receive a copy of the class from notary registry 624 and hash(es) 640, which correspond to the class(es) loaded for the computing process. Runtime/interpreter validator 606 may generate a hash for the corresponding classes stored in image registry 624 and compare the generated hash(es) with hash(es) 640. If generated hash(es) and hash(es) 640 are equal, then the loaded classes are deemed to be valid, and no remedial action is taken. However, if generated hash(es) and hash(es) 640 are not equal, runtime/interpreter validator 606 may generate notification 612, which indicates the classes that are invalid, and provides notification 612 to mitigator 122, as shown in FIG. 1. This advantageously determines whether each loaded class is an instance of its prototype and has not been modified by malicious code.

To determine whether a class loader used to load a particular class is valid, runtime/interpreter validator 606 may further receive class loader information via runtime characteristics 636. The class loader information may identify the class loader(s) utilized to load classes and the classes loaded by each of the class loader(s). Runtime/interpreter validator 606 may further receive class loader information stored in notary registry 624, which specifies the class loaders that are configured to load the classes specified by the image file, as determined from the static analysis of the image file. Interpreter validator 606 may compare the class loader information from runtime characteristics 636 to the class loader information retrieved from notary registry 624 to determine whether the classes loaded during application execution were loaded by the statically-determined class loaders. For example, if the class loader information received via runtime characteristics 636 indicates that class loader A loaded class B, runtime/interpreter validator 606 determines whether the class loader information received via image registry 624 also indicates that class B is to be loaded by class loader A. If the class loader information from image registry 624 specifies that a different class loader was to be utilized, runtime/interpreter validator 606 may provide notification 612 to mitigator 122 that specifies that a class was loaded via malicious process. However, if the class loader information retrieved from image registry 624 specifies the same class loader, no remedial action is taken.

Figure 9:
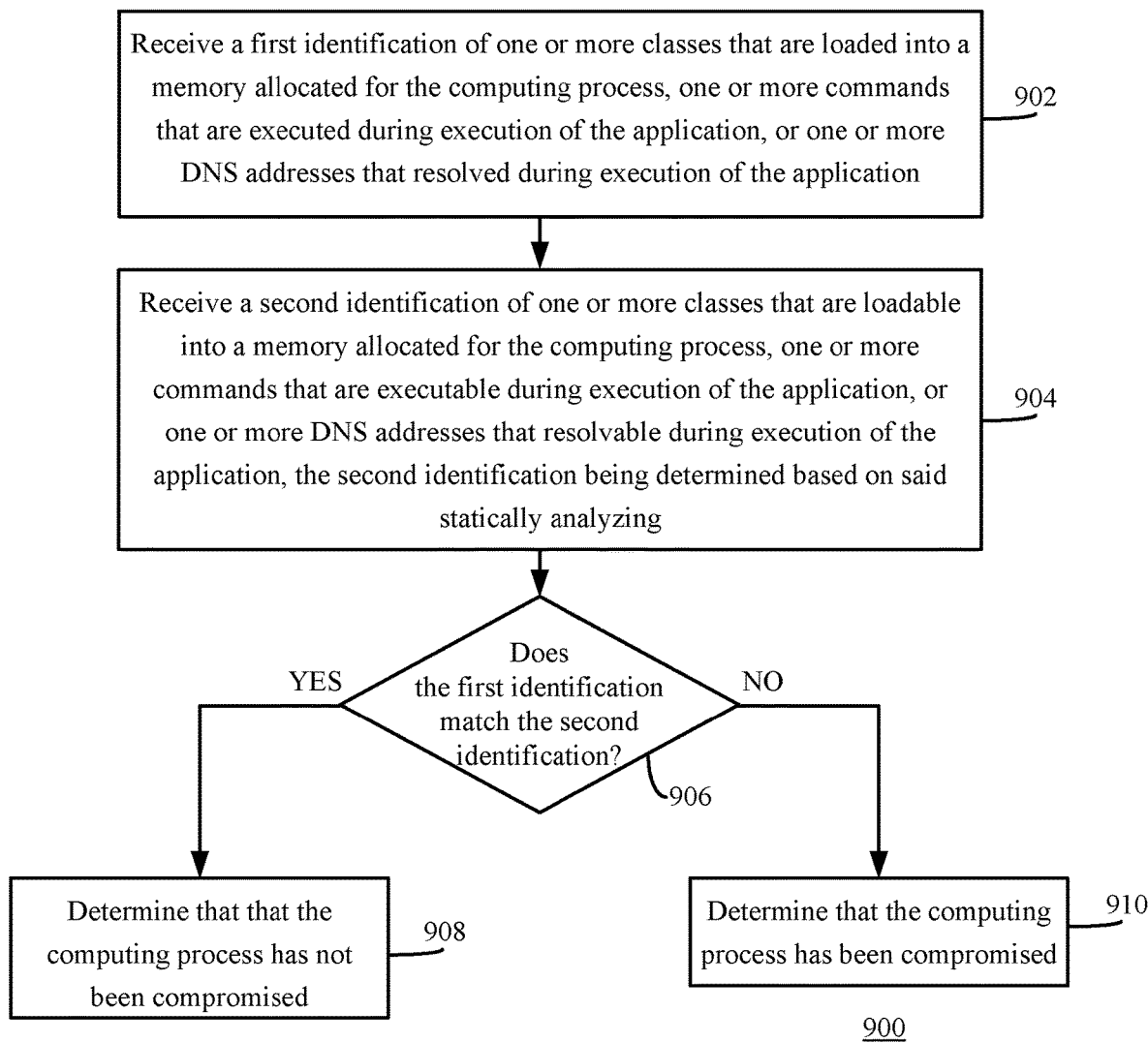
FIG. 9 shows a flowchart of a method for validating classes loaded by an application, commands executed by an application and/or domain name server (DNS) addresses resolved by an application in accordance with an example embodiment.

Accordingly, runtime/interpreter validator 606 may be configured to validate classes loaded by an application, commands executed by an application and/or DNS addresses resolved by an application in many ways. For example, FIG. 9 shows a flowchart 900 of a method for validating classes loaded by an application, commands executed by an application and/or DNS addresses resolved by an application, according to an example embodiment. In an embodiment, flowchart 900 may be implemented by runtime/interpreter validator 606, as shown in FIG. 6. Accordingly, flowchart 900 will be described with continued reference to FIG. 6. Other structural and operational embodiments will be apparent to persons skilled in the relevant art(s) based on the following discussion regarding flowchart 900 and runtime/interpreter validator 606 of FIG. 6.

Flowchart 900 of FIG. 9 begins with step 902. In step 902, a first identification of one or more classes that are loaded into a memory allocated for the computing process, one or more commands that are executed during execution of the application, or one or more DNS addresses that resolved during execution of the application is received. For example, with reference to FIG. 6, runtime/interpreter validator 606 receives the first identification via runtime characteristics 636 from supervisor 618, which receives runtime characteristics 636 from a data miner (e.g., data miner 226).

In step 904, a second identification of one or more classes that are loadable into a memory allocated for the computing process, one or more commands that are executable during execution of the application, or one or more DNS addresses that are resolvable during execution of the application is received. The second identification is determined based on a statistical analysis of the image file corresponding to the application. For example, with reference to FIG. 6, runtime/interpreter validator 606 receives the second identification from notary registry 624. The second identification is determined based on a static analysis of the image file corresponding to the application (as performed by notary 400 shown in FIG. 4).

In step 906, a determination is made as to whether the first identification matches the second identification. If a determination is made that first identification matches the second identification, flow continues to step 908. Otherwise, flow continues to step 910. For example, with reference to FIG. 6, runtime/interpreter validator 606 determines whether first identification matches the second identification.

In step 908, a determination is made that the computing process has not been compromised. For example, with reference to FIG. 6, runtime/interpreter validator 606 determines that the computing process has not been compromised.

In step 910, a determination is made that the computing process has been compromised. For example, with reference to FIG. 6, runtime/interpreter validator 606 determines that the computing process has been compromised. Runtime/interpreter validator 606 may provide notification 612 responsive to determining that the computing process has been compromised.

D. Mitigator Embodiments

Figure 10:
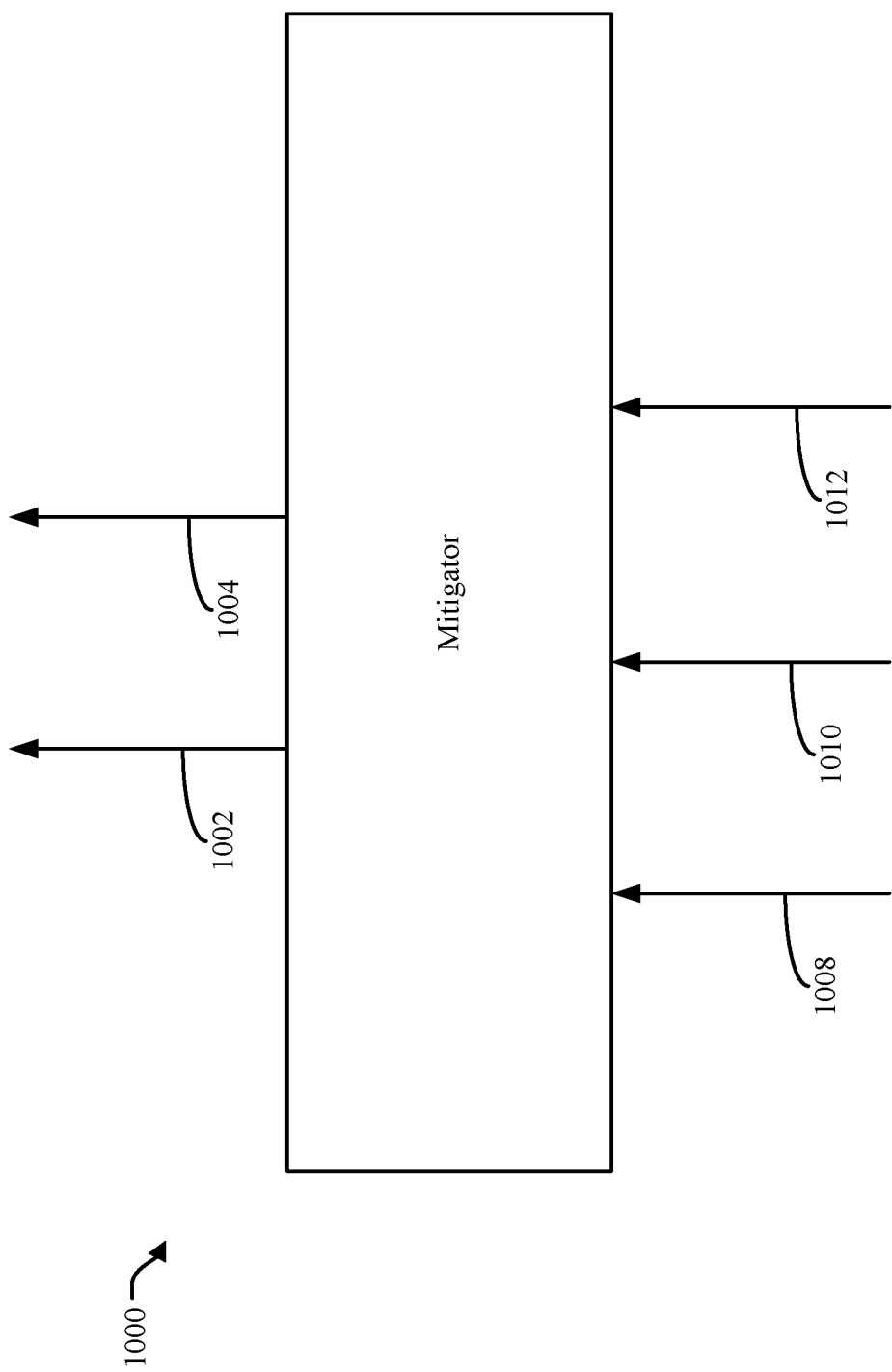
FIG. 10 shows a block diagram of a mitigator in accordance with an example embodiment.

FIG. 10 is a block diagram of a mitigator 1000 in accordance with an example embodiment. Mitigator 1000 is an example of mitigator 122, as described above with reference to FIG. 1. Mitigator 1000 may be configured to receive notifications from validator 620 as described above with reference to FIG. 6. For example, mitigator 100 may receive a notification 1008, a notification 1010, and a notification 1012. Notifications 1008, 1010, and 1012 are examples of notifications 608, 610, and 612, as respective described above with reference to FIG. 6. Responsive to receiving one or more notifications 1008, 1010, and/or 1012, mitigator 1000 may perform a remedial action to mitigate the malicious code executing on a compute instance (e.g., compute instance 108, as shown in FIG. 1). For instance, mitigator 1000 may send a notification 1002 to a user (e.g., an administrator). Notification 1002 may comprise an e-mail message, a short messaging service (SMS) message, a ticketing message (e.g., sent to an information technology (IT) ticketing application), etc. Mitigator 1000 may also send a notification 1004 to a particular component of a compute environment (compute environment 102 shown in FIG. 1) that causes the compute environment to remove and/or recommission the compute instance and/or image file 110, stop, suspend, or restart a compromised process and/or threads thereof of the application, revoke credentials, etc. For instance, notification 1004 may indicate to the component of the compute environment that the compute instance is unhealthy. In response, the component may perform the appropriate remedial action. The component of the compute environment may be configured to manage compute instance(s). In an embodiment in which the compute environment is a cloud-based environment, the component may be an orchestrator that automates the deployment and/or scaling of image(s). In such an embodiment, the notification may be sent to the orchestrator, and the orchestrator removes and/or recommissions the problematic compute instance and/or the original image file stored in the image registry and/or stops, suspends, or restarts a compromised process and/or threads thereof, revoke credentials, etc. In an embodiment in which the problematic compute instance is a virtual machine, the component may be a virtual machine manager (also known as a "hypervisor") that manages the execution of the virtual machine, and the virtual machine manager may remove and/or recommission the problematic compute instance and/or the original image file stored in the image registry and/or stop, suspend, or restart a compromised process and/or threads thereof, revoke credentials, etc. It is noted that managing components described above are purely exemplary and that other components configured to manage compute instances may be utilized to perform a remedial action.

III. Additional Example Embodiments

A. Additional Data Collection Mechanisms

Figure 11:
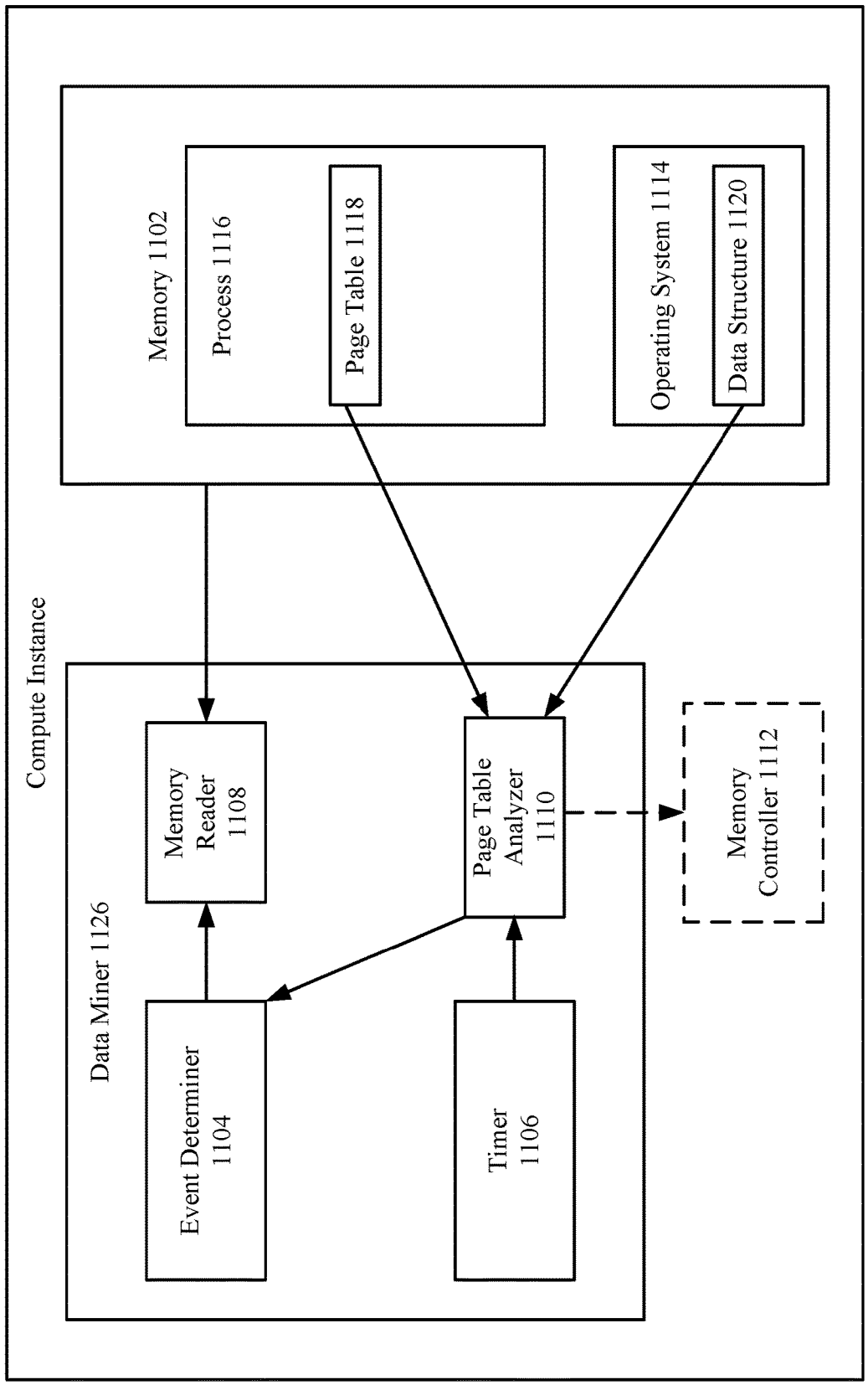
FIG. 11 shows a block diagram of a compute instance configured to detect changes of a page table and initiate runtime characteristic collection based thereon in accordance with an example embodiment.

As described above with reference to FIG. 2, data miner 226 may collect runtime characteristics of a process responsive to a particular event occurring. In an accordance with an embodiment, the event is a change in a page table associated with a process. For instance, FIG. 11 is a block diagram of compute instance 1100 configured to detect changes of a page table and initiate runtime characteristic collection based thereon in accordance with an embodiment. Compute instance 1100 is an example of compute instance 200, as described above with reference for FIG. 2. As shown in FIG. 11, compute instance 1100 comprises a data miner 1126 and a memory 1102, which are examples of data miner 226 and memory 202, as described above with reference to FIG. 2. Data miner 1126 comprises at least a timer 1106, an event determiner 1104, and a memory reader 1108, which are examples of timer 206, event determiner 204 and memory reader 208, as described above with reference to FIG. 2. Data miner 1126 also comprises a page table analyzer 1110. Memory 1102 comprises a process 1116 and an operating system 1114. Process 1116 represents a running instance of an application corresponding to an image. Process 1116 is an example of process 216. Process 1116 comprises a page table 1118. Operating system 1114 comprises a data structure 1120. Data structure 1120 may be configured to store information related to the address space of process 1116 in memory 1102, including page table 1118. In accordance with an embodiment in which operating system 1114 is Linux-based, data structure is an mm_struct structure. In accordance with an embodiment in which operating system 1114 is Windows-based, data structure 1120 is virtual address descriptor (VAD) tree.

Additional components of data miner 1126 (as described above with reference to FIG. 2) and additional aspects of memory 902 (as also described above with reference to FIG. 2.) are not shown for the sake of brevity.

Page table 1118 stores a mapping between virtual addresses utilized by process 1116 and physical addresses corresponding to the virtual addresses. Virtual addresses are used by the program corresponding to process 1116, while physical addresses are used by the hardware (e.g., the memory subsystem) of the computing device on which the program executes. Page table 1118 may also store one or more status bits associated with each page. For instance, may comprise a present/absent bit, one or more protection bits, a reference bit, a caching bit, and/or a modified bit. The present/absent bit indicates whether a particular page is present or absent. The protection bit(s) indicate whether code may be executable from a page and/or a page is readable and/or writable. The reference bit indicates whether a page has been referred to in the last clock cycle. The caching bit indicates whether data caching is enabled or disabled. The modified bit indicates whether a page has been modified or not.

Page table analyzer 1110 may be configured to periodically poll both page table 1118 and data structure 1120 or hook operating system 1114 for particular operating system calls that trigger the reading of page table 1118 and data structure 1120. For instance, timer 1106 may be configured to provide an event to page table analyzer 1110 after expiration of a predetermined time period. Responsive to receiving the event, page table analyzer 1110 may issue operating system calls that read both page table 1118 and data structure 1120. Page table analyzer 1110 may compare the contents of page table 1118 and the contents of data structure 1120 and determine whether there are any mismatches. The contents that are compared may comprise the virtual addresses, physical addresses, and/or any of the bits described above with reference to page table 1118.

In response to determining a mismatch, page table analyzer 1110 may provide a command to event determiner 1104 that instructs event determiner 1104 to provide an event notification to memory reader 1108. Responsive to receiving the event notification, memory reader 1108 collects runtime characteristics of process 1116 in a similar manner as described above with reference to FIG. 2.

In accordance with an embodiment, rather than reading page table 1118 via an operating system call, page table analyzer 1110 may read the physical address space at which page table 1118 is located using direct memory access (DMA). For instance, page table analyzer 1110 may circumvent operating system 1114 and issue a command to a memory controller (e.g., memory controller 1112) of compute instance 1100, which issues a read command to a physical address at which page table 1118 is located in physical memory. The read command may be issued via a bus that couples memory controller 1112 to memory 1102.

Figure 12:
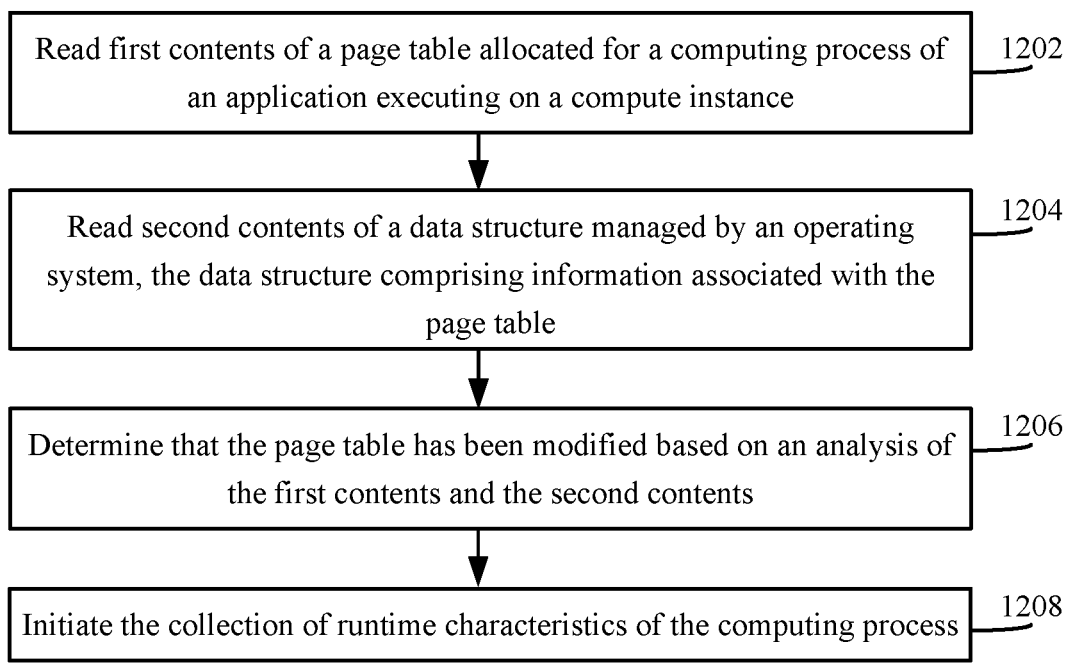
FIG. 12 shows a flowchart of a method for initiating the collection of runtime characteristics based on a detected change of a page table in accordance with an example embodiment.

Accordingly, data miner 1126 may be configured to initiate the collection of runtime characteristics in many ways. For example, FIG. 12 shows a flowchart 1200 of a method for initiating the collection of runtime characteristics based on a detected change of a page table, according to an example embodiment. In an embodiment, flowchart 1200 may be implemented by data miner 1126, as shown in FIG. 12. Accordingly, flowchart 1200 will be described with continued reference to FIG. 11. Other structural and operational embodiments will be apparent to persons skilled in the relevant art(s) based on the following discussion regarding flowchart 1200 and data miner 1126 of FIG. 11.

Flowchart 1200 of FIG. 12 begins with step 1202. In step 1202, first contents of a page table allocated for a computing process of an application executing on a compute instance is read. For example, with reference to FIG. 11, page table analyzer 1110 reads the contents of page table 1118, which is allocated for process 1116.

In step 1204, second contents of a data structure managed by an operating system is read, the data structure comprising information associated with the page table. For example, with reference to FIG. 11, page table analyzer 1110 reads the contents of data structure 1120 managed by operating system 1114.

In accordance with an embodiment, page table analyzer 1110 reads the contents of page table 1118 and data structure 1120 responsive to an expiration of a predetermined timeout. For instance, timer 1106 may provide a notification to page table analyzer 1110 responsive to an expiration of a predetermined timeout.

In accordance with an embodiment, page table analyzer 1110 issues an operating system call to read the contents of page table 1118. In accordance with another embodiment, page table analyzer 1110 issues a command to memory controller 1112, which issues a read command to a physical address at which page table 1118 is located in physical memory. The read command may be issued via a bus that couples memory controller 1112 to memory 1102.

In accordance with an embodiment, data structure 1120 is an mm_struct structure. In accordance with another embodiment, data structure 1120 is a VAD tree.

In step 1206, a determination is made that the page table is modified based on an analysis of the first contents and the second contents. For example, with reference with FIG. 11, page table analyzer 1110 determines that page table 1118 has been modified based on analysis of the first contents and the second contents.

In step 1208, the collection of runtime characteristics of the computing process is initiated responsive to determining that the page table is modified. For example, with reference to FIG. 11, memory reader 1108 initiates the collection of runtime characteristics of process 1116 responsive to page table analyzer 1110 determining that page table 1118 has been modified. For example, page table analyzer 1110 may provide a command to event determiner 1104, which causes event determiner 1104 to command memory reader 1108 to initiate the collection process.

Figure 13:
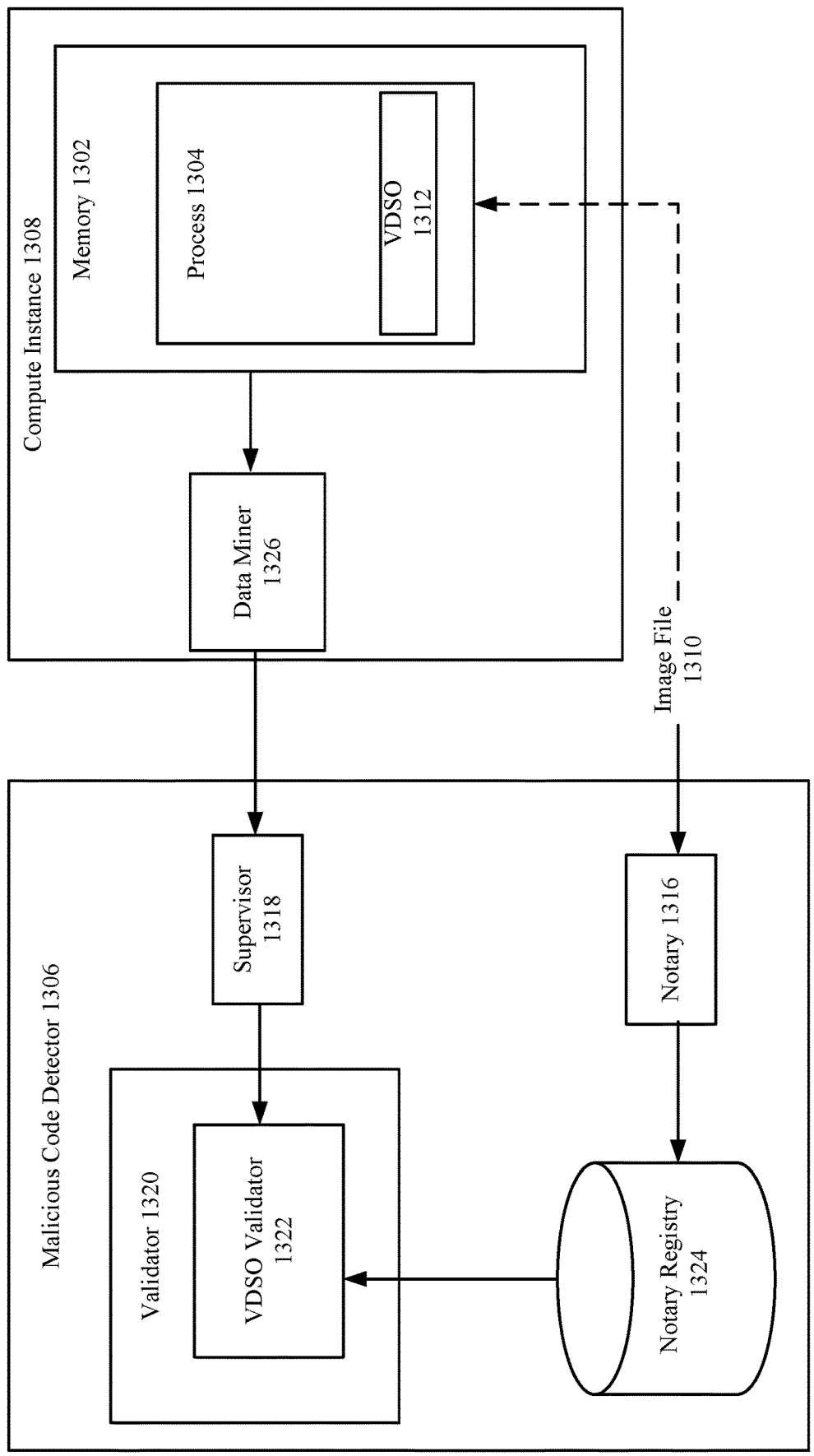
FIG. 13 shows a block diagram of a system for validating a virtual dynamic shared object (VDSO) associated with a process in accordance with an embodiment.

B. Additional Validation Mechanisms a. Virtual Dynamic Shared Object (VDSO) Validation FIG. 13 is a block diagram of a system 1300 for validating a virtual dynamic shared object (VDSO) associated with a process in accordance with an embodiment. System 1300 comprises a compute instance 1308 and a malicious code detector 1306. Compute instance 1308 and malicious code detector 1306 are examples of compute instance(s) 108 and malicious code detector 106, as shown in FIG. 1. Compute instance 1308 comprises a data miner 1326 and a memory 1302. Data miner 1326 and memory 1302 are examples of data miner 226 and memory 202, as described above with reference to FIG. 2. Malicious code detector 1306 comprises a validator 1320, a notary 1316, a notary registry 1324, and a supervisor 1318. Validator 1320, notary 1316, notary registry 1324, and supervisor 1318 are examples of validator 120, notary 116, notary registry 124, and supervisor 118, as described above with reference to FIG. 1. As shown in FIG. 13, memory 1302 comprises a process 1304, which represents a running instance of an application corresponding to image 1310. Process 1304 is an example of process 216, as described above with reference to FIG. 2, and image 1310 is an example of image 110, as described above with reference to FIG. 1. As further shown in FIG. 13, memory 1302 comprises a VDSO 1312 that has been mapped into the user space of process 1304, and validator 1320 comprises a VDSO validator 1322. Additional components of compute instance 1308 and malicious code detector 1306 (as described above in Subsection II) and additional aspects of memory 1302 (as also described above with reference to Subsection II) are not shown for the sake of brevity.

VDSO 1312 is a shared library that an operating system's kernel automatically maps into the address space of a user-space application (i.e., process 1304). VDSO 1312 accelerates the execution of certain system calls to do not necessarily have to run in kernel space.

Notary 1316 may be configured to statically analyze image 1310 and locate a VDSO image located therein (e.g., located at "/lib/modules/'uname-r'/vdso.'"). Notary 1316 may extract the information located therein and store the information in notary registry 1324.

After image 1310 has been mapped into memory 1302 and the corresponding process 1304 executes, data miner 1326 may be configured to read the corresponding mapped VDSO (i.e., VDSO 1312) from memory 1302 and provide the contents thereof to supervisor 1318. Supervisor 1318 provides the contents to VDSO validator 1322. Data miner 1326 may read VDSO 1312 responsive to receiving an event, as described above in Subsection II.A.

It has been observed that the static version of VDSO (i.e., the VDSO image included in image 1310) comprises NOP(s) spread over 3 bytes. During runtime, when the VDSO image is mapped into memory 1302 (i.e., VDSO 1312), the NOP(s) are converted into one load fence (LFENCE) instruction comprising a three-byte NOP. This occurs in the three bytes before a Read Time-Stamp Counter (RDTSC) instruction, which fetches the number of CPU cycles since program execution from an appropriate register (e.g., the Time Stamp Counter (TSC) register).

VSDO validator 1322 may be configured to determine whether VDSO 1312 has been modified and compromised by malicious code by comparing the VDSO information provided by data miner 1326 and the VDSO information retrieved from notary registry 1324. If VDSO validator 1322 determines that the only difference(s) between such information are the three-byte groups before RDTSC instructions, then VSDO validator 1324 determines that VDSO 1312 has not been modified and compromised. However, if VDSO validator 1322 determines that difference(s) exist between such information (other than the three-byte groups before RDTSC instruction), VSDO validator 1322 determines that VDSO 1312 has been modified and compromised and causes a remedial action to be performed in a similar manner as described above with reference to Subsection II.D.

b. Third Party Package Validation

A customer may utilize a program that automates the deployment of third party packages to a compute instance. An example of such a program is Chef, Puppet, Ansible, and/or the like. Such a program may attempt to update/install applications automatically by retrieving such packages from a repository, for example, to install security updates, bug fixes, etc. When installing such packages, multiple files of the original image corresponding to the application are updated to a new version and/or new files are added. If the malicious code detector (as described herein) does not have notarized data for these packages, and some processes use such packages, these third party packages will be inadvertently determined to be malicious. Embodiments described herein provide techniques for handling third party packages so that applications in which such packages are installed are correctly analyzed for malicious code.

Figure 14:
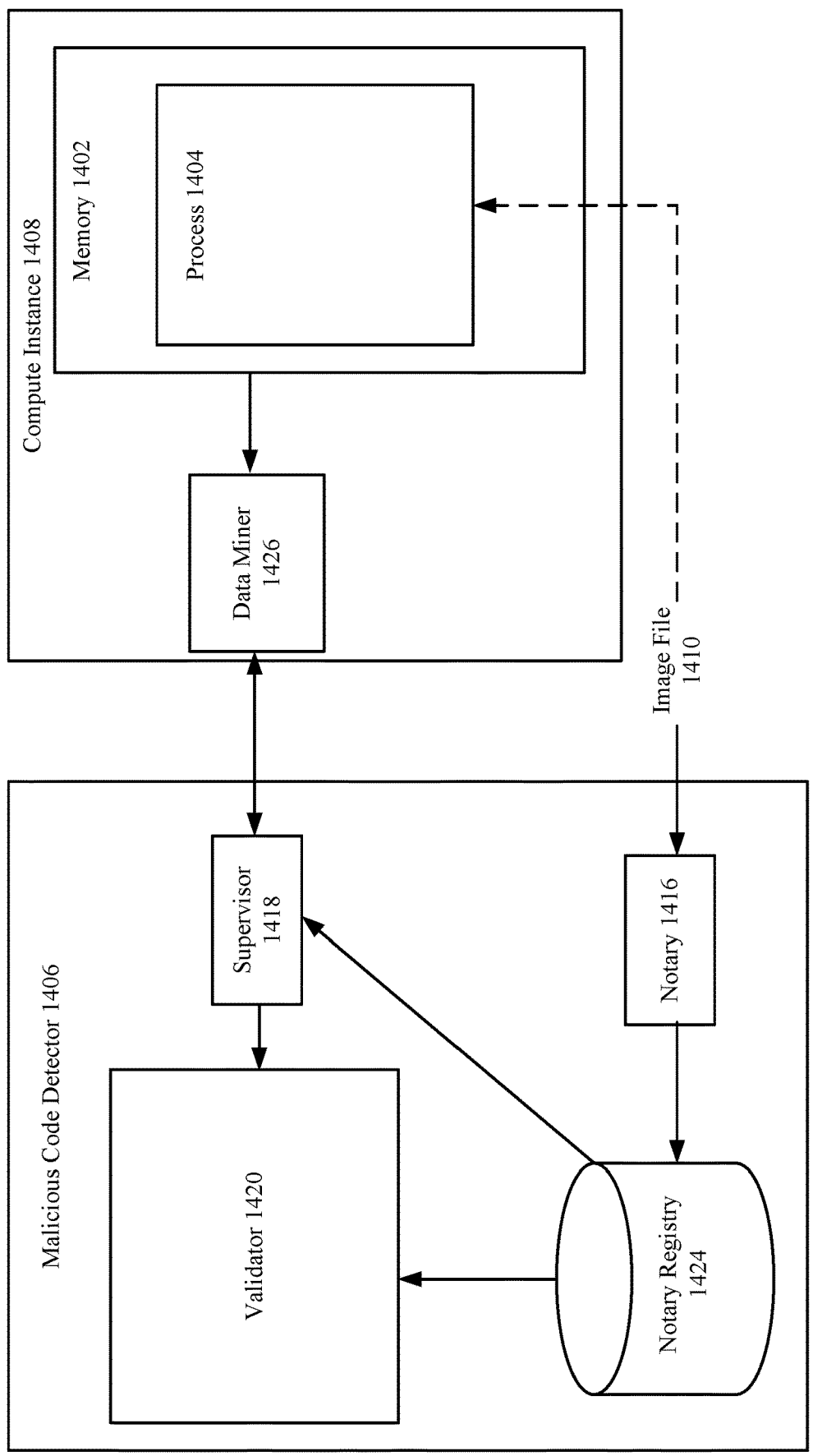
FIG. 14 shows a block diagram of a system for validating an application in which third party packages are installed in accordance with an example embodiment.

FIG. 14 is a block diagram of a system 1400 for validating an application in which third party packages are installed in accordance with an example embodiment. System 1400 comprises a compute instance 1408 and a malicious code detector 1406. Compute instance 1408 and malicious code detector 1406 are examples of compute instance(s) 1308 and malicious code detector 1306, as shown in FIG. 13. Compute instance 1408 comprises a data miner 1426 and a memory 1402. Data miner 1426 and memory 1402 are examples of data miner 1326 and memory 1302, as described above with reference to FIG. 13. Malicious code detector 1406 comprises a validator 1420, a notary 1416, a notary registry 1424, and a supervisor 1418. Validator 1420, notary 1416, notary registry 1424, and supervisor 1418 are examples of validator 1320, notary 1316, notary registry 1324, and supervisor 1318, as described above with reference to FIG. 13. As shown in FIG. 14, memory 1402 comprises a process 1404, which represents a running instance of an application corresponding to image 1410. Process 1404 is an example of process 1304, as described above with reference to FIG. 13, and image 1410 is an example of image 1310, as described above with reference to FIG. 13. Additional components of compute instance 1408 and malicious code detector 1406 (as described above in Subsection II) and additional aspects of memory 1402 (as also described above with reference to Subsection II) are not shown for the sake of brevity.

Notary 1424 may be configured to statically analyze image 1410 and determine a list of packages of image 1410 and/or a list of files for each of the packages in the list. The package list and/or file list are stored in notary registry 1424.

Responsive to receiving an event from an event determiner, as described above in Subsection II.A, data miner 1426 may be configured to query supervisor 1418 for the package list and/or file list for each image mapped in memory 1402. Supervisor 1418 retrieves the lists from notary registry and provides the lists to data miner 1426. Data miner 1426 monitors the processes (e.g., process 1404) executing on compute instance 1408 (e.g., via apt, pip, etc.) and/or monitors for the usage of package managers by different deployment tools. For each process 1404, data miner 1426 waits for process 1404 to terminate and indexes all files and/or packages in the file system into a file list and/or package list. Data miner 1426 then determines a difference between the list of packages and/or list of packages received from supervisor 1418 and the lists determined thereby. Alternatively, data miner 1426 may obtain a list of packages and/or list of files that are to be updated and/or a list of the new files that will be added from a database maintained by the package manager of the package being installed and determine the differences accordingly. When determining runtime characteristics of process 1404, data miner 1426 does not collect information about these files and/or packages and/or does not notify supervisor 1418 of such files. Thus, validator 1420 has no knowledge of these new/updated files and does not inadvertently flag these files as malicious.

c. Global Offset Table (GOT) and Procedure Linkage Table (PLT) Validators

Figure 15:
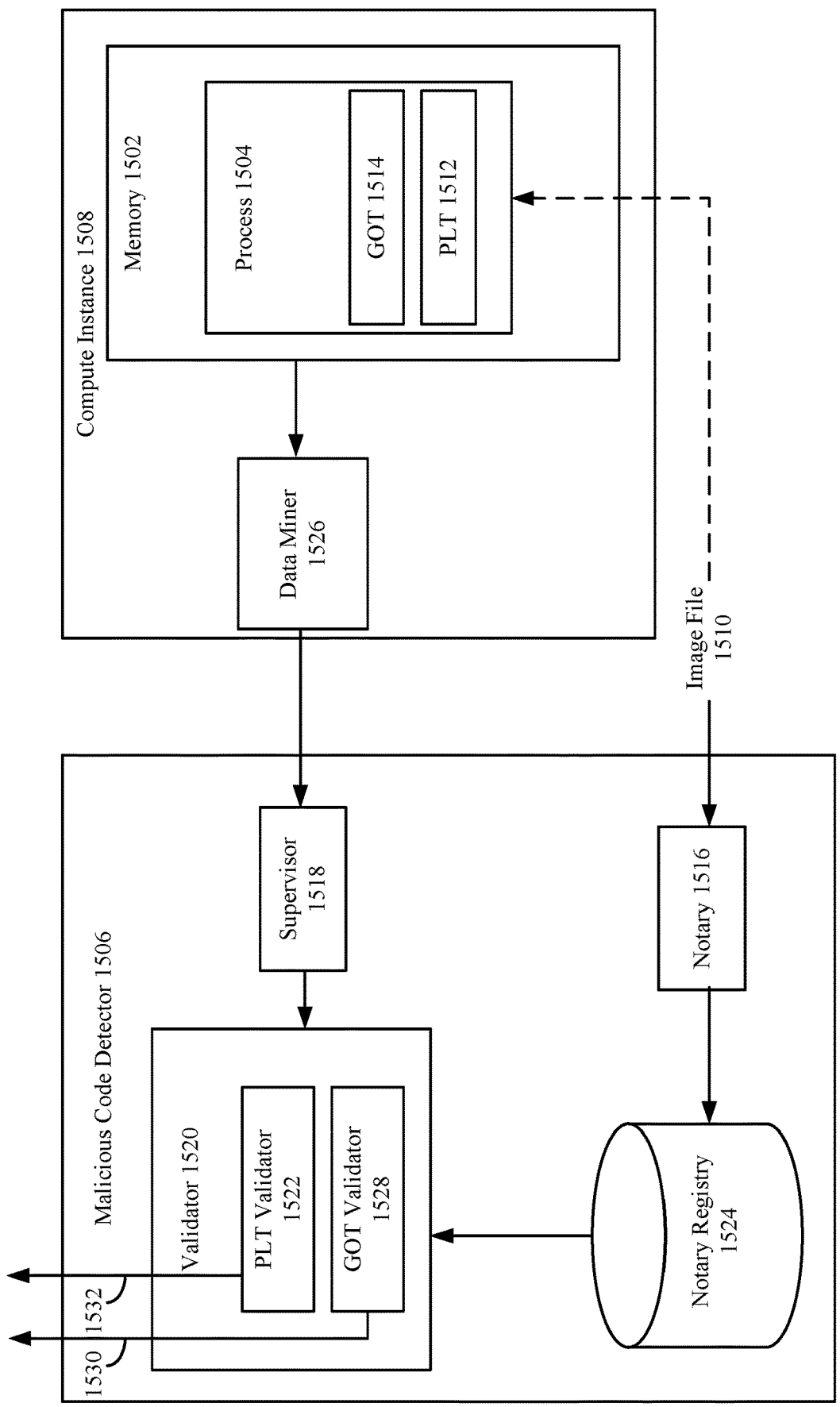
FIG. 15 shows a block diagram of a system for validating a Global Offset Table (GOT) and a Procedure Linkage Table (PLT) associated with a process in accordance with an example embodiment.

FIG. 15 is a block diagram of a system 1500 for validating a GOT and PLT associated with a process in accordance with an example embodiment. System 1500 comprises a compute instance 1508 and a malicious code detector 1506. Compute instance 1508 and malicious code detector 1506 are examples of compute instance(s) 1408 and malicious code detector 1406, as shown in FIG. 14. Compute instance 1508 comprises a data miner 1526 and a memory 1502. Data miner 1526 and memory 1502 are examples of data miner 1426 and memory 1402, as described above with reference to FIG. 14. Malicious code detector 1506 comprises a validator 1520, a notary 1516, a notary registry 1524, and a supervisor 1518. Validator 1520, notary 1516, notary registry 1524, and supervisor 1518 are examples of validator 1420, notary 1416, notary registry 1424, and supervisor 1418, as described above with reference to FIG. 14. As shown in FIG. 15, memory 1502 comprises a process 1504, which represents a running instance of an application corresponding to image 1510. Process 1504 is an example of process 1404, as described above with reference to FIG. 14, and image 1510 is an example of image 1410, as described above with reference to FIG. 14. As further shown in FIG. 15, memory 1502 comprises a PLT 1512 and a GOT 1514 that have been mapped into the user space of process 1504, and validator 1520 comprises a PLT validator 1522 and a GOT validator 1528. Additional components of compute instance 1508 and malicious code detector 1506 (as described above in Subsection II) and additional aspects of memory 1502 (as also described above with reference to Subsection II) are not shown for the sake of brevity.

PLT 1512 is used to call external procedures/functions whose addresses are not known at the time of linking, and is left to be resolved by a dynamic linker at runtime. The GOT 1514 is used to hold the addresses of the corresponding PLT stubs (which call the dynamic linker, if yet to be resolved) or the resolved addresses of the external functions.

1. GOT Validation

The embodiments described herein verify that all external library calls originate from a signed shared object and that each entry in GOT 1514 holds the location of a correct function. In particular, process 1504 should be originated from an executable file of image file 1510. The executable file contains symbols, some of which are dynamically linked from shared libraries. Thus, to verify GOT 1514, a correlation between a symbol name, its virtual address and the shared library it points to is determined. A virtual address where each shared library was mapped is determined, and the offset where each symbol is stored in that shared library (in image file 1510) is determined.

Notary 1516 may be configured to statically analyze image file 1510 and read the dynamic symbols table (.dynsym), the relocation table (.rela.dyn), and a string table (e.g., dynstr), as specified by the header and/or sections of image file 1510. Notary 1516 may also be configured to read the string table and dynamic symbols table of each shared library required for each executable. Notary 1516 may then build a symbol name to offset map and obtain the GOT section offset from a base address from the section header of image file 1510. The map and/or GOT section offset may be stored in notary registry 1524.

Responsive to receiving an event from an event determiner, as described above in Subsection II.A, data miner 1526 may be configured to read GOT 1514 from memory 1502 and/or may execute a '/proc/<PID>/maps' command to obtain a file of the memory mappings and provides such data to supervisor 1518. Supervisor 1518 provides such data to GOT validator 1528.

GOT validator 1528 may parse the obtained GOT-related information and correlate between symbols and loaded addresses. The foregoing may be performed as follows. GOT validator 1528 may build a dictionary for GOT 1514, which comprises the offset from the start of GOT 1514 to the entry of GOT 1514 at that offset (referred to as "got table"). Then, the offset from the start of GOT 1514 is determined based on the offset of the relocation table associated with process 1504. Thereafter, a dictionary is generated for the relocation table, which comprises the index from the start of the string table associated with process 1504 to the offset from the base and the actual loaded address of the symbol. Then, GOT validator 1528 builds a dictionary for the string table, which comprises the index from the start of the string table to the actual symbol name. GOT validator 1528 builds a final dictionary, which maps between the symbol name to its location in the relocation dictionary. This creates a mapping between a symbol to its base and virtual loaded address.

Once the symbol to loaded address mapping is determined, GOT validator 1528 obtains the offset of each symbol from the start of the shared library it is loaded from via the maps command). Thereafter, GOT validator 1528 determines if the original symbol offset from the start of the shared library is the same as this one for every symbol. For instance, GOT validator 1528 may correlate between each symbol entry in the symbol table associated with process 1504 to its symbol name from the string table. GOT validator 1528 may iterate over the symbol table and, for each symbol, check whether its name is the name of the symbol that GOT validator 1528 is looking for. If the name of the symbol is the sought after name, the value from the symbol list is obtained from the symbol table (its value is the offset from the start of the shared object). The value of the symbol in the symbol table (retrieved from notary registry 1524 is compared to the offset of the symbol from the loaded library in run time. If it is a match, validation is successful. If not, GOT validator provides a notification 1530 to a mitigator (e.g., mitigator 1000, as shown in FIG. 10) that causes the mitigator to perform a remedial action, as described above with reference to Subsection II.D.

2. GOT IFunc (GNU Indirect Functions) Optimization

GNU indirect functions are an extension of ELF that allow the programmer to make a decision about which implementation of a function to use at link time. This allows the programmer to choose the fastest code for a particular processor, which is very useful if the code is shipped as binaries. It involves an ELF symbol type (STT_GNU_IFUNC) and a new dynamic relocation (R_*_IRELATIVE), which have been added to the GNU ld and gold linkers and the glibc dynamic linker.

A challenge arises due to the fact that the implementation of the symbol is chosen during runtime, thereby making it difficult for GOT validator 1528 to know which symbol will be chosen. To validate such functions, GOT validator 1528 compares the symbol value offset in memory, as received via data miner 1526 to every implementation that is available for this symbol, which may be stored in image registry 1524. If it matches, then GOT validator 1528 determines that the function is validated.

The possible implementations of the symbol may be obtained by extracting the possible resolution addresses. This may be performed as follows. GOT validator 1528 may receive and/or generate a file (e.g., a JSON file) that contains the hex representation of the code excluding the addresses of every known IFUNC function. GOT validator 1528 may compare the function offset in memory to the function offset in image file 1510, which may be stored in notary registry 1524. If the offsets do not match, the library is checked to see if the symbol type of the symbol in question is of type IFUNC. If it does, the symbol name is checked to see if it has an entry in the JSON file. If it does, the format of the code of the function is checked to determine if it matches the one in a corresponding entry in the JSON file and the possible resolution addresses (plus offset from beginning of the code plus the offset from the start of the shared object) is extracted. If it does not match, GOT validator 1528 checks if the format of the code of the function matches one of the possible functions from which it is known how to extract the possible resolution addresses from. If the format matches, the addresses are extracted and compared. If the addresses match, then the function is validated.

3. PLT Validation

PLT validator 1522 verifies every call to PLT 1512 jumps to the right place in GOT 1514. This is achievable as entries in PLT 1512 should never change (PLT jumps are relative to the current offset of the instruction pointer and end up in the corresponding GOT 1514 entries, designed never to be amended by having the opcode be exactly the address size in GOT 1514 (i.e., 8 bytes)).

Notary 1516 may be configured to statically analyze image file 1510 and to read its PLT allocated for GOT 1514 and/or a global PLT and stores the PLT(s) in image registry 1524.

Responsive to receiving an event from an event determiner, as described above in Subsection II.A, data miner 1526 may be configured to read PLT 1512. PLT 1512 may represent both the PLT allocated for GOT and the global PLT. Data miner 1526 may provide the PLT 1512 (and/or the contents thereof) to supervisor 1518, which provides such data to PLT validator 1522.

PLT validator 1522 may be configured to compare the PLT information received via data miner 1526 and the PLT information received via notary registry 1524 bit by bit and determine whether any differences exist. Alternatively, the tables may also be parsed to the actual addresses that entries of PLT are pointing to in GOT 1514 and are compared. Upon finding any differences, PLT validator 1522 may issue a notification 1532 to a mitigator (e.g., mitigator 1000, as shown in FIG. 1), and the mitigator performs a remedial action, as described above with reference to Subsection II.D. If no differences are found, no remedial action is taken.

d. Data Source Query Validation

Figure 16:
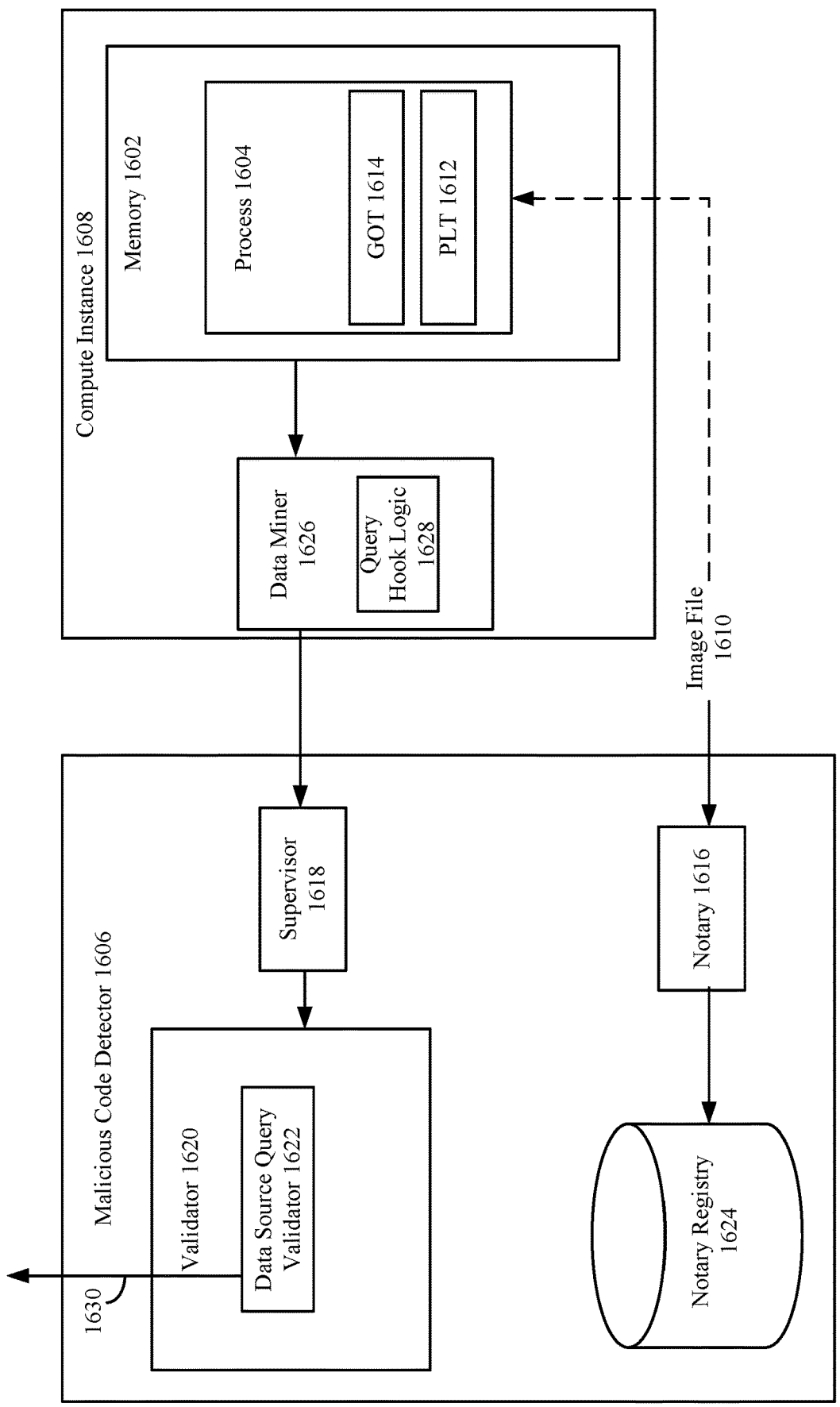
FIG. 16 shows a block diagram of a system for validating data source queries in accordance with an example embodiment.

FIG. 16 is a block diagram of a system 1600 for validating data source queries in accordance with an example embodiment. System 1600 comprises a compute instance 1608 and a malicious code detector 1606. Compute instance 1608 and malicious code detector 1606 are examples of compute instance(s) 1508 and malicious code detector 1506, as shown in FIG. 15. Compute instance 1608 comprises a data miner 1626 and a memory 1602. Data miner 1626 and memory 1602 are examples of data miner 1526 and memory 1502, as described above with reference to FIG. 15. Malicious code detector 1606 comprises a validator 1620, a notary 1616, a notary registry 1624, and a supervisor 1618. Validator 1620, notary 1616, notary registry 1624, and supervisor 1618 are examples of validator 1520, notary 1516, notary registry 1524, and supervisor 1518, as described above with reference to FIG. 15. As shown in FIG. 16, memory 1602 comprises a process 1604, which represents a running instance of an application corresponding to image 1610. Process 1604 is an example of process 1504, as described above with reference to FIG. 15, and image 1610 is an example of image 1510, as described above with reference to FIG. 15. As further shown in FIG. 16, data miner 1626 comprises query hook logic 1628, and validator 1520 comprises a data source query validator 1622. Additional components of compute instance 1608 and malicious code detector 1606 (as described above in Subsection II) and additional aspects of memory 1602 (as also described above with reference to Subsection II) are not shown for the sake of brevity.

Query hook logic 1628 may be configured to hook network buffers and/or a connection driver of a specific data source (such as a database) and trap query commands (e.g., SQL commands). Upon detecting a query command, query hook logic 1628 causes data miner 1626 to read the contents of the address space of memory 1602 allocated for process 1604. For instance, query hook logic 1628 may provide an event to an event determiner of data miner 1626 (e.g., event determiner 204, as shown in FIG. 2), which in turn sends a command to a memory reader of data miner 1626 (e.g., memory reader 208, as shown in FIG. 2) that causes the memory reader to read contents of the address space of memory 1602 allocated for process 1604. Before allowing the query to be sent, data miner 1626 reads address space of process 1604 for information. The information includes, but is not limited to, executed code memory pages/frames and/or contents of the stack (e.g., stack 220, as shown in FIG. 2). The stack may include both a native stack and an interpreter stack.

Data miner 1626 provides such information to supervisor 1618, which provides the information to data source query validator 1622. Data source query validator 1622 traverses the information obtained for the stack to locate each executed function identified therein and analyzes the relevant executed code to extract query mnemonics (e.g., relevant SQL, Object-Relational-Mapping (ORM), etc. syntax). Data source query validator 1622 removes the extracted mnemonics from the trapped query and determines whether there is any remaining extra query code and/or syntax. If any query code and/or syntax remains, data source query validator 1622 determines that malicious code has been injected and provides a notification 1630 to a mitigator (e.g., mitigator 1000, as shown in FIG. 10), which performs a remedial action (e.g., cancels the query), as described above with reference to Subsection II.D. Otherwise, data source query validator 1622 determines that no malicious code has been injected (i.e., the validation has passed) and no remedial action is taken.

e. Forensics Mechanism

While the foregoing techniques describe that a validator may determine whether code has been compromised, a validator may determine that it requires more information from a data miner to make a more accurate assessment. In such a situation, the validator may request additional information from the data miner.

Figure 17:
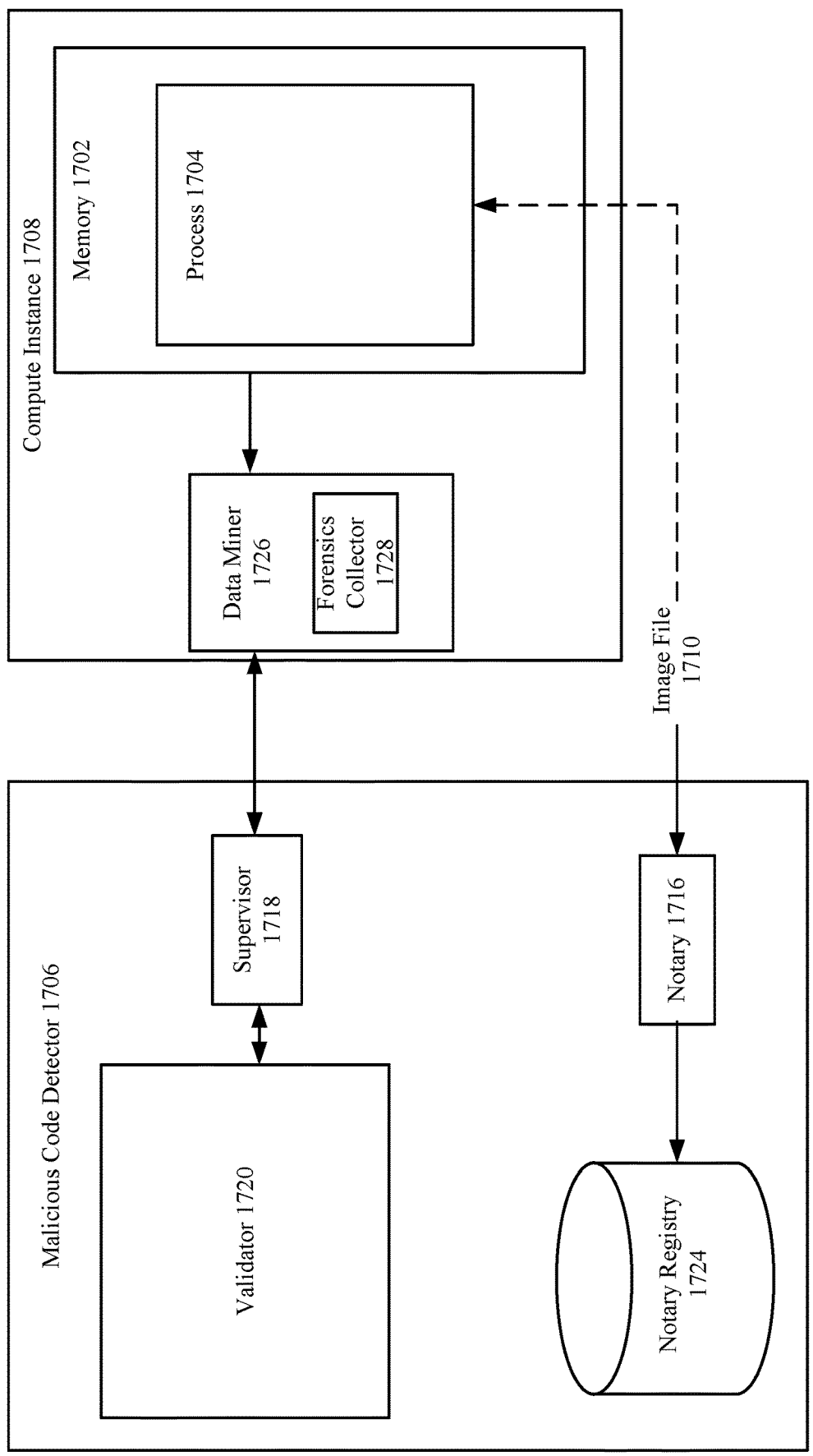
FIG. 17 shows a block diagram of a system for obtaining forensics information in accordance with an example embodiment.

FIG. 17 is a block diagram of a system 1700 for obtaining forensics information in accordance with an example embodiment. System 1700 comprises a compute instance 1708 and a malicious code detector 1706. Compute instance 1708 and malicious code detector 1706 are examples of compute instance(s) 1608 and malicious code detector 1606, as shown in FIG. 16. Compute instance 1708 comprises a data miner 1726 and a memory 1702. Data miner 1726 and memory 1702 are examples of data miner 1626 and memory 1602, as described above with reference to FIG. 16. Malicious code detector 1706 comprises a validator 1720, a notary 1716, a notary registry 1724, and a supervisor 1718. Validator 1720, notary 1716, notary registry 1724, and supervisor 1718 are examples of validator 1620, notary 1616, notary registry 1624, and supervisor 1618, as described above with reference to FIG. 16. As shown in FIG. 17, memory 1702 comprises a process 1704, which represents a running instance of an application corresponding to image 1710. Process 1704 is an example of process 1604, as described above with reference to FIG. 16, and image 1710 is an example of image 1610, as described above with reference to FIG. 16. As further shown in FIG. 17, data miner 1726 comprises a forensics collector 1628. Additional components of compute instance 1708 and malicious code detector 1706 (as described above in Subsection II) and additional aspects of memory 1702 (as also described above with reference to Subsection II) are not shown for the sake of brevity.

Validator 1720 may comprise any of the validators described above (e.g., native code validator 602, existence validator 604, runtime/interpreter validator 606, VDSO validator 1322, PLT validator 1522, GOT validator 1528, and data source query validator 1622. In the event that validator determines that additional information is required to determine whether compute instance 1708 has been compromised, validator 1720 may issue a query to supervisor 1718. Supervisor 1718 provides the query to data miner 1726.

Forensics collector 1728 of data miner 1726 receives the query and obtains additional information (e.g., the entire executable section or entire memory space of process 1704) and provides the information to supervisor 1718 via a response. Supervisor 1718 provides the response to validator 1720, and validator 1720 reassesses whether compute instance 1708 has been compromised based on the additional information included in response.

C. Exploit and Vulnerability Detection a. Deserialization Attack Identification

The embodiments described enable the detection of a plurality of different attacks. One such attack is a deserialization attack. External modules may be passed to an application in a serialized manner. The typical case is when serialized data is passed to an application, and the data is deserialized and loaded into an object operated on by the application. A deserialization attack exploits this mechanism by passing in malicious code to the application in a serialized fashion, which is then deserialized and causes the application to perform unintended tasks (e.g., Denial of service (DoS) attacks, spawning a reverse shell, executing arbitrary code on a target, etc.).

Figure 18:
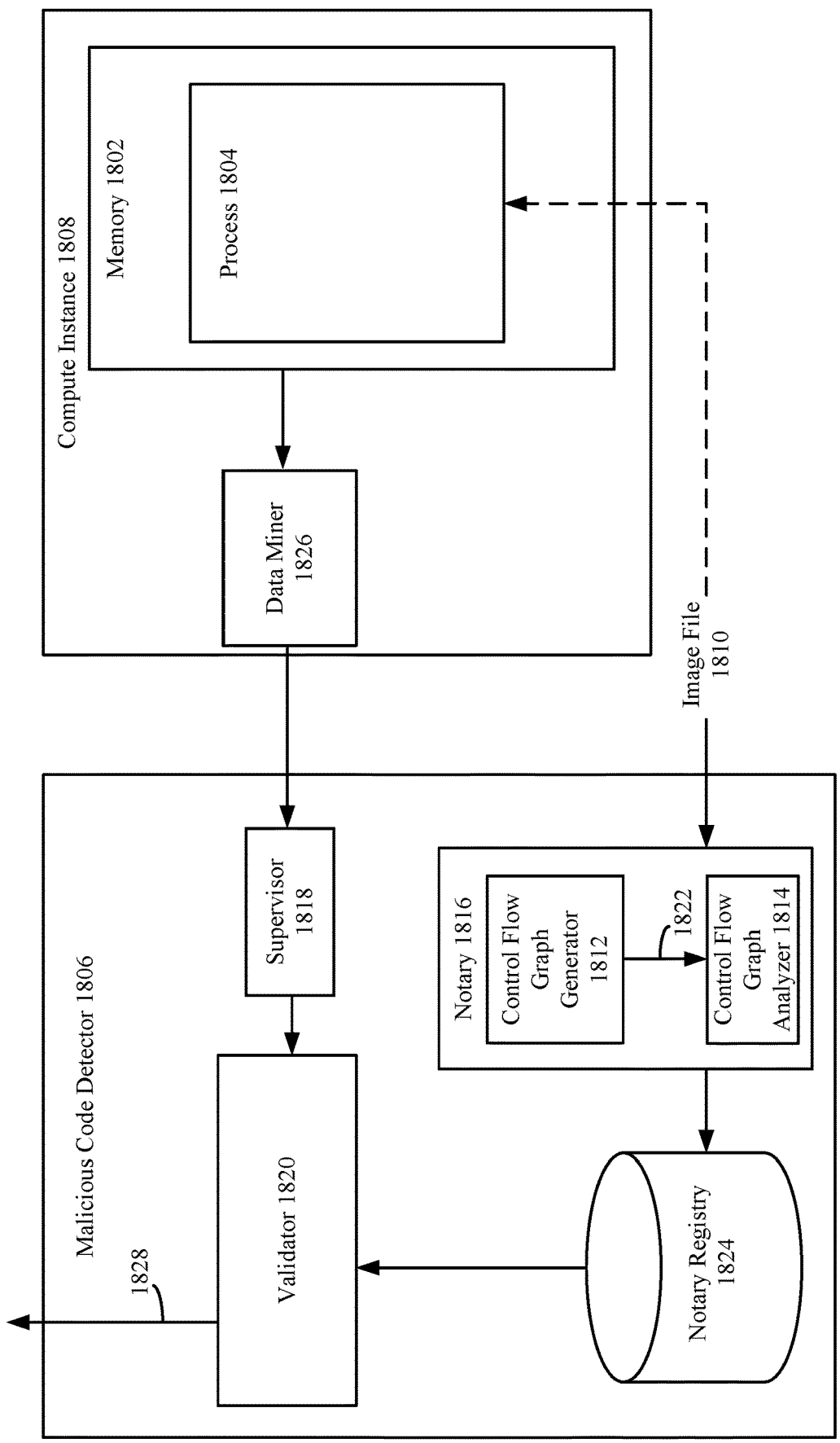
FIG. 18 shows a block diagram of a system for detecting deserialization attacks in accordance with an example embodiment.

FIG. 18 is a block diagram of a system 1800 for detecting deserialization attacks in accordance with an example embodiment. System 1800 comprises a compute instance 1808 and a malicious code detector 1806. Compute instance 1808 and malicious code detector 1806 are examples of compute instance(s) 1708 and malicious code detector 1706, as shown in FIG. 17. Compute instance 1808 comprises a data miner 1826 and a memory 1802. Data miner 1826 and memory 1802 are examples of data miner 1726 and memory 1702, as described above with reference to FIG. 17. Malicious code detector 1806 comprises a validator 1820, a notary 1816, a notary registry 1824, and a supervisor 1818. Validator 1820, notary 1816, notary registry 1824, and supervisor 1818 are examples of validator 1720, notary 1716, notary registry 1724, and supervisor 1718, as described above with reference to FIG. 17. As shown in FIG. 18, memory 1802 comprises a process 1804, which represents a running instance of an application corresponding to image 1810. Process 1804 is an example of process 1704, as described above with reference to FIG. 17, and image 1810 is an example of image 1710, as described above with reference to FIG. 17. As further shown in FIG. 18, notary 1816 comprises a control flow graph generator 1812 and control flow graph analyzer 1814. Control flow graph generator 1812 and control flow graph analyzer 1814 are examples of control flow graph generator 404 and control flow graph analyzer 406, as described above with reference to FIG. 4. Additional components of compute instance 1808 and malicious code detector 1806 (as described above in Subsection II) and additional aspects of memory 1802 (as also described above with reference to Subsection II) are not shown for the sake of brevity.

Control flow graph generator 1812 may be configured to generate a control flow graph 1822 based on image file 1810. Control flow graph 1822 is an example of control flow graph 416, as described above with reference to FIG. 4. Once control flow graph 1822 is generated, control flow analyzer 1814 may analyze control flow graph 1822 to determine a portion thereof associated with a deserializer function. For example, control flow graph analyzer 1814 may search for anode that calls "ObjectInputStream.readObject( )". For each determined node, control flow graph analyzer 1814 traverses control flow graph 1822 to determine the strongest typed variable that can hold a pointer to the result of the deserializer function. The corresponding class is added to a whitelist that is stored in notary registry 1824.

Responsive to receiving an event from an event determiner, as described above in Subsection II.A, data miner 1826 instruments functions that perform deserialization functions (e.g., resolveObject, loadClass, etc.) and provides the class names of incoming serialized objects to supervisor 1818, which provides the class names to validator 1820. Validator 1820 compares the class name to the class names in the whitelist, which is retrieved from notary registry 1824. If there is a match, no remedial action is taken. Otherwise, validator 1820 may issue a notification 1828 to a mitigator (e.g., mitigator 1000, as shown in FIG. 10) that causes remedial action to be performed (e.g., throwing an exception that the deserialized function is already known, a class not found error, shutting down compute instance 1808, restarting compute instance 1808, sending an alert to a client, etc.), as described above with reference to Subsection II.D.

b. Loaded Vulnerability Detection and Management

Figure 19:
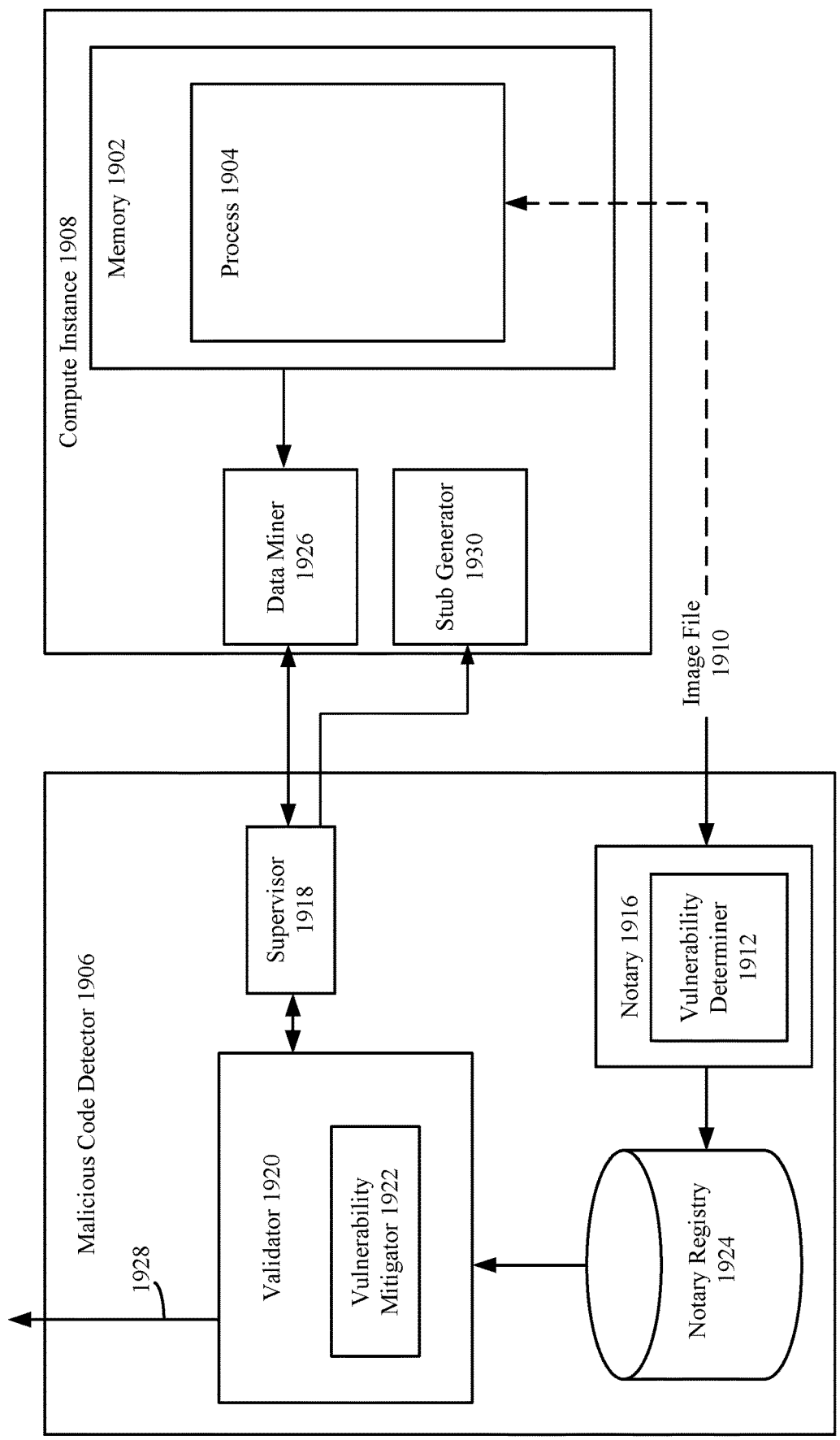
FIG. 19 shows a system for detecting and managing vulnerabilities in a computing process in accordance with an example embodiment.

FIG. 19 is a system 1900 for detecting and managing vulnerabilities in a computing process in accordance with an example embodiment. FIG. 19 is a block diagram of a system 1900 for detecting and managing vulnerabilities in a computing process in accordance with an embodiment. System 1900 comprises a compute instance 1908 and a malicious code detector 1906. Compute instance 1908 and malicious code detector 1906 are examples of compute instance(s) 1808 and malicious code detector 1806, as shown in FIG. 18. Compute instance 1908 comprises a data miner 1926 and a memory 1902. Data miner 1926 and memory 1902 are examples of data miner 1826 and memory 1802, as described above with reference to FIG. 18. Malicious code detector 1906 comprises a validator 1920, a notary 1916, a notary registry 1924, and a supervisor 1918. Validator 1920, notary 1916, notary registry 1924, and supervisor 1918 are examples of validator 1820, notary 1816, notary registry 1824, and supervisor 1818, as described above with reference to FIG. 18. As shown in FIG. 19, memory 1902 comprises a process 1904, which represents a running instance of an application corresponding to image 1910. Process 1904 is an example of process 1804, as described above with reference to FIG. 18, and image 1910 is an example of image 1810, as described above with reference to FIG. 18. As further shown in FIG. 19, notary 1916 comprises a vulnerability determiner 1912. Validator 1820 comprises a vulnerability mitigator 1922. Additional components of compute instance 1908 and malicious code detector 1906 (as described above in Subsection II) and additional aspects of memory 1902 (as also described above with reference to Subsection II) are not shown for the sake of brevity.

Vulnerability determiner 1912 may be configured to analyze image file 1910 to determine a list of packages therein. List of packages is stored in notary registry 1924. Notary registry 1924 may further comprise a list of packages that contain known vulnerabilities (e.g., functions or objects included in the packages that are known to have vulnerabilities). Such a list may be referred to as a blacklist of packages. The list may be obtained by querying a known vulnerabilities database (e.g., the National Vulnerability Database (NVD), although the embodiments described herein are not so limited.

Vulnerability mitigator 1922 retrieves the list of packages included in image file 1910 and the blacklist of packages from notary registry 1924. Vulnerability mitigator 1922 compares the list of packages of image file 1910 and the blacklist of packages to determine whether any packages in image file 1910 contain any known vulnerabilities. For each determined vulnerability, vulnerability mitigator 1922 may indicate whether such a vulnerability can be mitigated.

Data miner 1926 may be configured to read the contents of memory 1902 by issuing a '/proc/<PID>/maps' command (via a memory reader, for example memory reader 208, as shown in FIG. 2) and determine which files are loaded (and subsequently determine which packages are loaded based on the determined files) into memory 1902 and provides a listing of packages loaded into memory 1902 to vulnerability mitigator 1922. In the event that package or file was not loaded in memory, data miner 1926 may monitor and/or hook certain mechanisms for loading a library in different runtimes, such as Python, Bash, Node, Ruby, Perl, etc.

Vulnerability mitigator 1922 may classify each vulnerability included in a package of image file 1910 as having a particular risk. For example, if a particular vulnerability is not loaded in memory 1902, as identified by data miner 1926, vulnerability mitigator 1922 may determine that such a vulnerability is low risk and does not perform any remedial actions. If a particular vulnerability is loaded in memory 1902 and it is indicated as being mitigatable, vulnerability mitigator 1922 may determine that such a vulnerability is medium risk. If a particular vulnerability is loaded in memory 1902 and it is indicated as not being mitigatable, vulnerability mitigator 1922 may determine that such a vulnerability is a high risk.

Vulnerability mitigator 1922 may provide a notification 1928 to a user (e.g., via mitigator 1000, as shown in FIG. 10) that specifies the vulnerabilities in the list of packages included in image file 1910 and their associated risks. Vulnerability mitigator 1928 may only perform a remedial action for vulnerabilities labeled as being medium risk, as it can be anticipated that malicious code execution is imminent. No remedial action may be taken for vulnerabilities that are not loaded in memory 1902. Remedial actions can be compute intensive and/or may cause significant downtime of a particular compute instance. Limiting when vulnerabilities are mitigated advantageously reduces such processing and downtime. In the event that a high risk vulnerability is loaded in memory 1902, the user may take the appropriate action to mitigate such a risk, e.g., shutting down compute instance 1908 on which the vulnerability is loaded.

In accordance with an embodiment, vulnerability mitigator 1922 causes a remedial action to be performed for vulnerabilities that are not loaded into memory 1902. For instance, compute instance 1908 may comprise a stub generator 1930. Stub generator 1930 may create a stub version of a vulnerable function or shared object associated with the vulnerable package. The stub version may simply perform a NOP and/or log the action performed with respect to the stub version. When such an object is called by the application, the stub version of the object is called instead of the actual shared object, thereby preventing the vulnerability from being exploited.

It is noted that additional prioritization and/or classification criteria may be utilized in addition to, or in lieu of whether a vulnerability is loaded and/or mitigatable. For instance, vulnerability mitigator 1922 may prioritize and/or classify a vulnerability based on whether the vulnerability has openly available exploit code, based on the severity of the vulnerability (e.g., a Common Vulnerability Scoring System (CVSS) score), based on whether the vulnerability is common in the monitored compute environment (e.g., compute environment 102), for example, whether the vulnerability affects a relatively larger percentage of compute instances and/or images as opposed to affecting a relatively smaller percentage of compute instance and/or images), etc.

Figure 20:
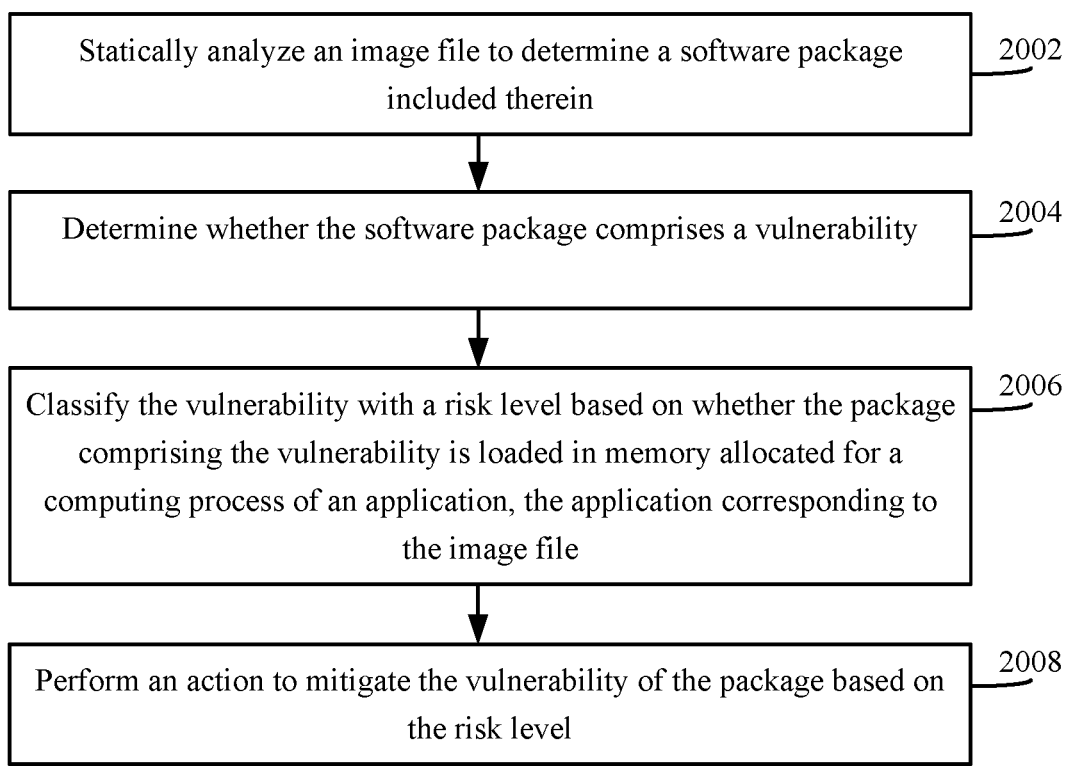
FIG. 20 shows a flowchart of a method for detecting and managing vulnerabilities of a computing process in accordance with an example embodiment.

Accordingly, vulnerabilities may be detected and managed in many ways. For example, FIG. 20 shows a flowchart 2000 of a method for detecting and managing vulnerabilities of a computing process, according to an example embodiment. In an embodiment, flowchart 2000 may be implemented by malicious code detector 1906, as shown in FIG. 19. Accordingly, flowchart 2000 will be described with continued reference to FIG. 19. Other structural and operational embodiments will be apparent to persons skilled in the relevant art(s) based on the following discussion regarding flowchart 2000 and malicious code detector 1906 of FIG. 19.

Flowchart 2000 of FIG. 20 begins with step 2002. In step 2002, an image file is statically analyzed to determine a software package included therein. For example, with reference to FIG. 19, vulnerability determiner 1912 of notary 1916 may statically analyze image file 1910 to determine software package(s) included therein. Vulnerability determiner 1912 may store a list of the determined packages in notary registry 1924

In step 2004, a determination is made as to whether the software package comprises a vulnerability. For example, with reference to FIG. 19, vulnerability mitigator 1922 may compare the list of determined packages to a blacklist of packages that are known to have vulnerabilities. The blacklist may also be stored in notary registry 1924. In the event that it is determined that the packages do not include known vulnerabilities, no remedial action is taken. Otherwise, flow continues to step 2006.

In step 2006, the vulnerability is classified with a risk level based on whether the package comprising the vulnerability is loaded in memory allocated for a computing process of an application. The application corresponds to the image file. For example, with reference to FIG. 19, data miner 1926 may read the contents of memory and determine which packages are loaded into memory 1902 and provides a listing of packages loaded into memory 1902 to vulnerability mitigator 1922. Vulnerability mitigator 1922 may classify the vulnerability determined to be in the package of image file 1910 with a risk level depending on whether that package is loaded in memory 1902.

In step 2008, an action is performed to mitigate the vulnerability of the package based on the risk level. For example, with reference to FIG. 19, vulnerability mitigator 1922 may cause a remedial action to be performed based on the risk level for the vulnerability. For instance, vulnerability mitigator 1922 may provide a notification to a mitigator (e.g., mitigator 1000) that causes the mitigator to perform a remedial action, as described above with reference to Subsection II.D.

Figure 21:
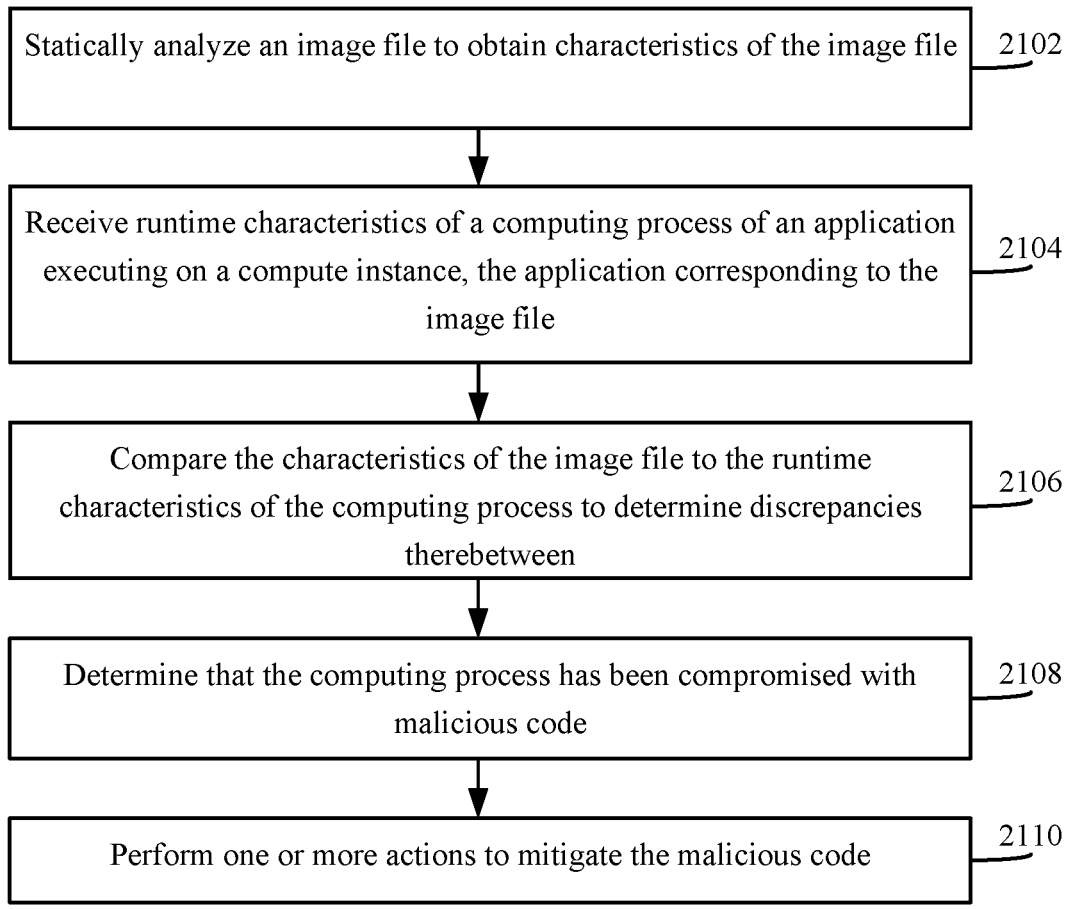
FIG. 21 shows a flowchart of a method for automatically mitigating a corrupted or compromised compute resource in accordance with an example embodiment.
Figure 22:
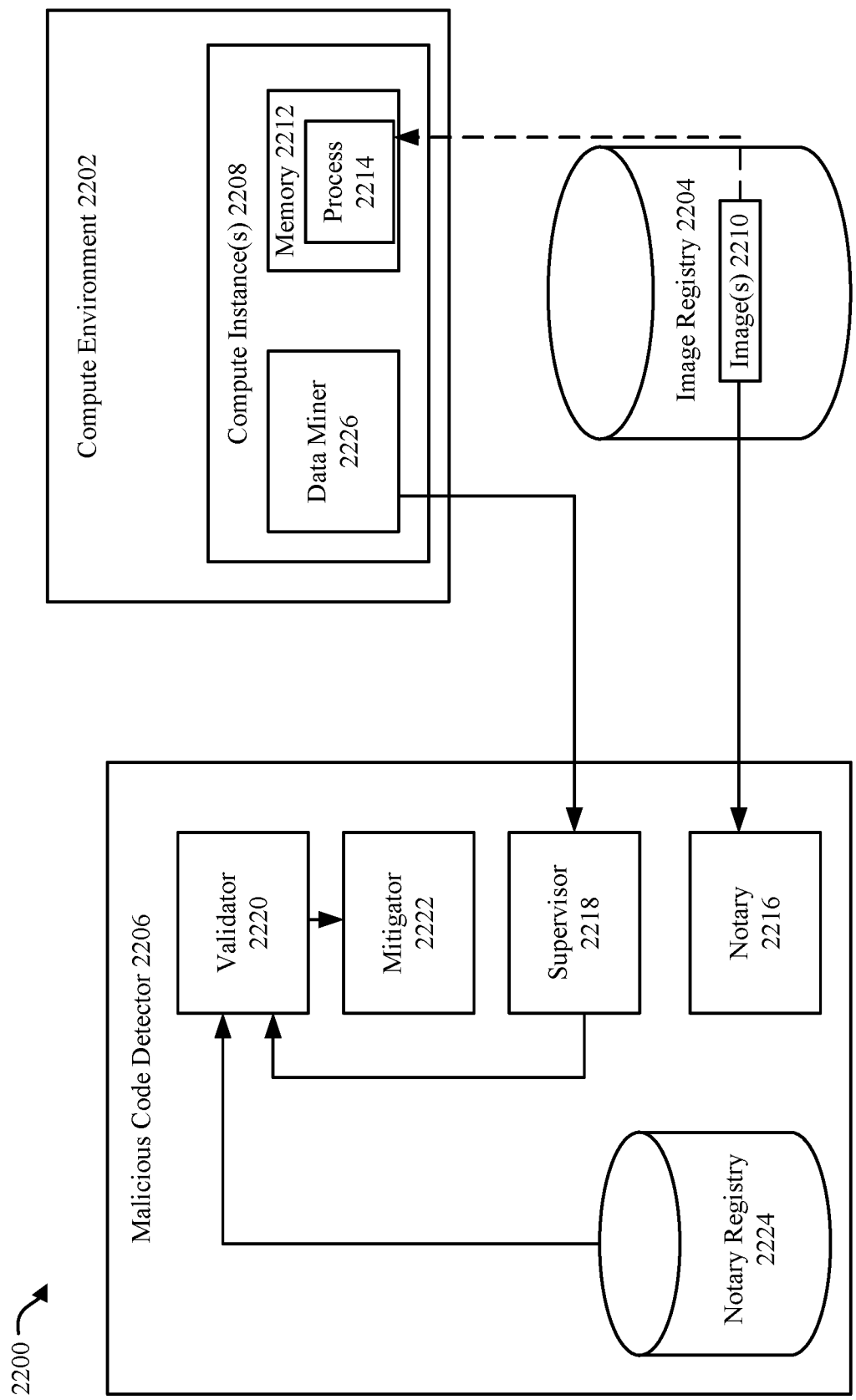
FIG. 22 shows a block diagram of a system for automatically mitigating a corrupted or compromised compute resource in accordance with an example embodiment.

IV. Method for Automatically Mitigating a Corrupted or Compromised Compute Resource FIG. 21 shows a flowchart 2100 of a method for automatically mitigating a corrupted or compromised compute resource, according to an example embodiment. In an embodiment, flowchart 300 may be implemented by a system 2200 shown in FIG. 22. FIG. 22 shows a block diagram of a system 2200 for automatically mitigating a corrupted or compromised compute resource in accordance with an example embodiment. As shown in FIG. 22, system 2200 includes a compute environment 2202, an image registry 2204 and a malicious code detector 2206. Compute environment 2202, image registry 2204 and malicious code detector 2206 are examples of compute environment 102, image registry 104 and malicious code detector 106, as described above with reference to FIG. 1

Image registry 2204 may comprise one or more image(s) 2210, which are examples of image(s) 110, as described above with reference to FIG. 1.

Malicious code detector 2206 may comprise a notary 2216, a supervisor 2218, a validator 2220, a mitigator 2222, and a notary registry 2224. Notary 2216, supervisor 2218, validator 2220, mitigator 2222, and notary registry 2224 are examples of notary 116, a supervisor 118, validator 120, mitigator 122, and notary registry 124, as described above with reference to FIG. 1. Compute environment 2202 may comprise compute instance(s) 2208, which are examples of compute instance(s) 108, as shown in FIG. 1. Compute instance(s) 108 may comprise a data miner 2226 and a memory 2212. Data miner 2226 is an example of data miners 126 and 226, as respectively described above with reference to FIGS. 1 and 2. Memory 2212 is an example of memory 202, as described above with reference to FIG. 2. Memory 2212 comprises a process 2214, which is an example of process 216, as described above with reference to FIG. 2. Process 2214 represents a running instance of an application corresponding to image file 2210. Other structural and operational embodiments will be apparent to persons skilled in the relevant art(s) based on the following discussion regarding flowchart 2100 and system 2200 of FIG. 22.

Flowchart 2100 of FIG. 21 begins with step 2102. In step 2102, an image file is statically analyzed to obtain characteristics of the image file. For example, with reference to FIG. 22, notary 2216 statically analyzes an image file of image(s) 2210 to determine characteristics of the image file.

In accordance with one or more embodiments, at least one or more of a header section, a code segment, or a data segment of the image is statically analyzed to determine the characteristics of the image file. For example, with reference to FIG. 22, notary 2216 may statically analyze at least one or more of a header section, a code segment, or a data segment of the image file of image(s) 2210.

In accordance with one or more embodiment, the image file may be statically analyzed in accordance with flowchart 300, as described above with reference to FIG. 3.

In accordance with one or more embodiments, the characteristics of the image file include one or more of one or more libraries that are dynamically-linkable during execution of the application, one or more packages included in the image file, one or more files included in the image file, one or more classes that are loadable during execution of the application, one or more commands that are executable during execution of the application, one or more domain name server (DNS) addresses that are resolvable during execution of the application, one or more class loaders that are configured to load the one or more classes or information associated with a virtual dynamic shared object (VDSO) file.

In step 2104, runtime characteristics of a computing process of an application executing on a compute instance are received, the application corresponding to the image file. For example, with reference to FIG. 22, data miner 2226 may analyze the address space allocated in memory 2212 for process 2214 of an application to determine the runtimes characteristics. The application corresponds to image file 2210. Supervisor 2218 receives the runtime characteristics and provides the runtime characteristics to validator 2220.

In accordance with one or more embodiment, the compute instance comprises at least one of a server, a virtual machine executing on the server, a computing node in a cloud-based environment, or an Internet-of-Things (IoT) device.

In accordance with one or more embodiments, the runtime characteristics may be received in accordance with steps 702 and 704 of flowchart 700, as described above with reference to FIG. 7.

In accordance with one or more embodiments, the runtime characteristics may be received in accordance with step 802 of flowchart 800, as described above with reference to FIG. 8.

In accordance with one or more embodiments, the runtime characteristics may be received in accordance with step 902 of flowchart 900, as described above with reference to FIG. 9.

In step 2106, the characteristics of the image file are compared to the runtime characteristics of the computing process to determine discrepancies therebetween. For example, with reference to FIG. 22, validator 2220 compares the characteristics of image file 2210 (as received from notary registry 2224) to the runtime characteristics of process 2214 (as received via data miner 2226) to determine discrepancies therebetween.

In accordance with one or more embodiments, validator 2220 performs the comparison in accordance with steps 706, 708, 710, 712, and 714 of flowchart 700, as described above with reference to FIG. 7.

In accordance with one or more embodiments, validator 2220 performs the comparison in accordance with steps 806, 808, and 810 of flowchart 800, as described above with reference to FIG. 8.

In accordance with one or more embodiments, validator 2220 performs the comparison in accordance with step 904, 906, 908, and 910 of flowchart 900, as described above with reference to FIG. 9.

In step 2108, responsive to determining discrepancies, a determination is made that the computing process has been compromised with malicious code. For example, with reference to FIG. 22, validator 2220 may be configured to determine that process 2214 has been compromised with malicious code.

In step 2110, one or more actions to mitigate the malicious code are performed. For example, with reference to FIG. 22, mitigator 2222 may perform action(s) to mitigate the malicious code.

In accordance with one or more embodiments, the actions comprise at least one of providing a notification to a user, stopping at least one of the computing process or the compute instance, suspending at least one of the computing process or the compute instance, or restarting at least one of the computing process or the compute instance.

V. Example Computer System Implementation

Figure 23:
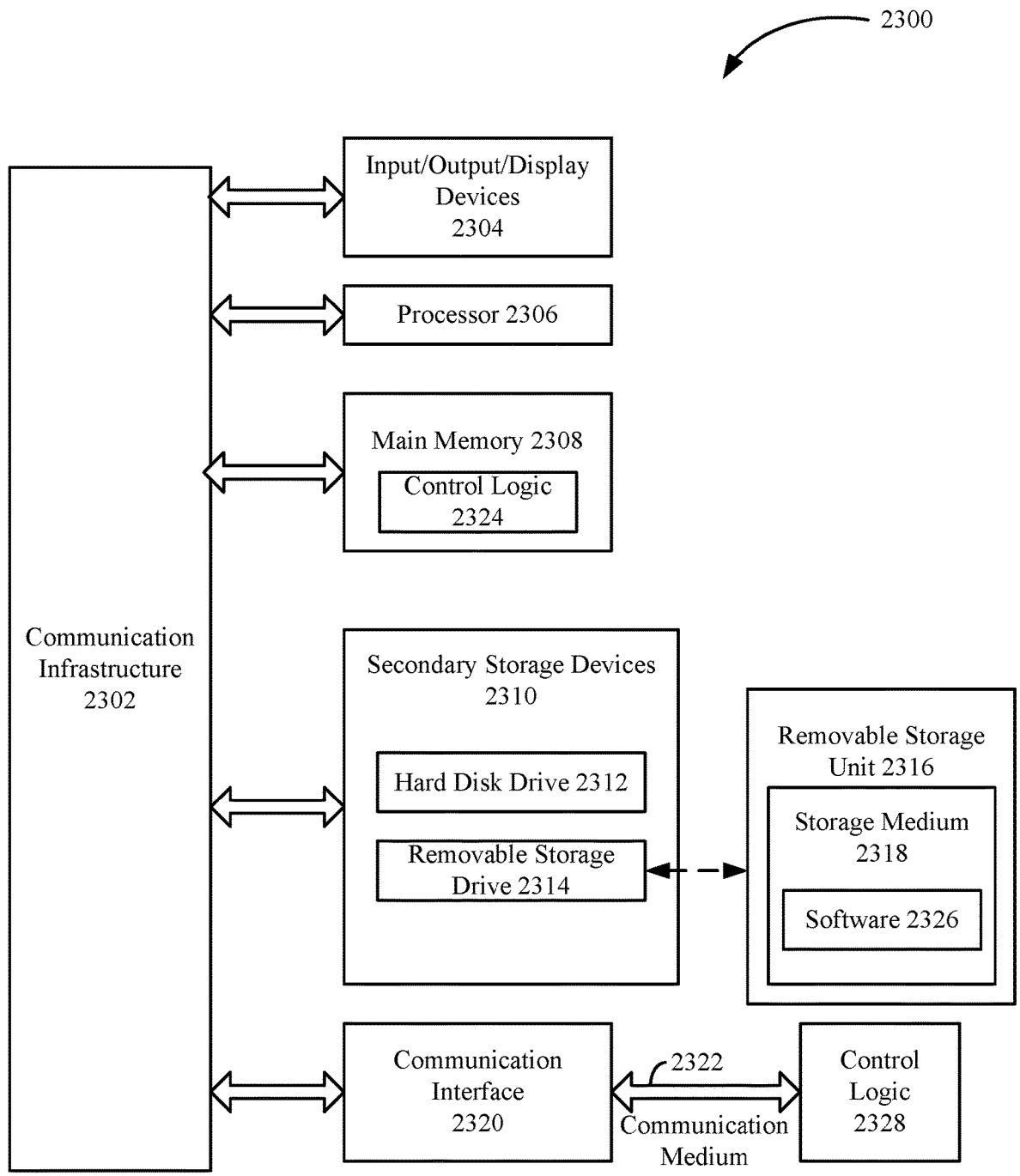
FIG. 23 is a block diagram of an example processor-based computer system that may be used to implement various embodiments.

The embodiments described herein, including systems, methods/processes, and/or apparatuses, may be implemented using well known processing devices, servers, smart phones, tablets, personal data assistants (PDAs), Internet-of-Things (IoT) devices, computers, etc. such as a computer 2300 shown in FIG. 23. It should be noted that computer 2300 may represent computing devices linked to, processing devices, traditional computers, and/or the like in one or more embodiments. For example, system 100 of FIG. 1, compute instance 200, notary 400, system 600, mitigator 1000, compute instance 1100, system 1300, system 1400, system 1500, system 1600, system 1700, system 1800, system 1900, and/or system 2200, and any of the sub-systems, components, and/or models respectively contained therein and/or associated therewith, and/or any of the steps of flowcharts 300, 500, 700, 800, 900, 1200, 2000, and/or 2100 may be implemented using one or more computers 2300.

Computer 2300 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 1000 may be any type of computer, including a desktop computer, a server, a mobile device (e.g., a tablet, a personal data assistant (PDA), a smart phone, a laptop, etc.), an IoT device, etc.

Computer 2300 includes one or more processors (also called central processing units, or CPUs), such as a processor 2306. Processor 2306 is connected to a communication infrastructure 2302, such as a communication bus. In some embodiments, processor 2306 can simultaneously operate multiple computing threads, and in some embodiments, processor 2306 may comprise one or more processors.

Computer 2300 also includes a primary or main memory 2308, such as random access memory (RAM). Main memory 2308 has stored therein control logic 2324 (computer software), and data.

Computer 2300 also includes one or more secondary storage devices 2310. Secondary storage devices 2310 include, for example, a hard disk drive 2312 and/or a removable storage device or drive 2314, as well as other types of storage devices, such as memory cards and memory sticks. For instance, computer 2300 may include an industry standard interface, such a universal serial bus (USB) interface for interfacing with devices such as a memory stick. Removable storage drive 2314 represents a floppy disk drive, a magnetic tape drive, a compact disk drive, an optical storage device, tape backup, etc.

Removable storage drive 2314 interacts with a removable storage unit 2316. Removable storage unit 2316 includes a computer useable or readable storage medium 2318 having stored therein computer software 2326 (control logic) and/or data. Removable storage unit 2316 represents a floppy disk, magnetic tape, compact disk, DVD, optical storage disk, or any other computer data storage device. Removable storage drive 2314 reads from and/or writes to removable storage unit 2316 in a well-known manner.

Computer 2300 also includes input/output/display devices 2304, such as touchscreens, LED and LCD displays, monitors, keyboards, pointing devices, etc.

Computer 2300 further includes a communication or network interface 2320. Communication interface 2320 enables computer 2300 to communicate with remote devices. For example, communication interface 2320 allows computer 2300 to communicate over communication networks or mediums 2322 (representing a form of a computer useable or readable medium), such as LANs, WANs, the Internet, etc. Network interface 2320 may interface with remote sites or networks via wired or wireless connections.

Control logic 2328 may be transmitted to and from computer 2300 via the communication medium 2322.

Any apparatus or manufacture comprising a computer useable or readable medium having control logic (software) stored therein is referred to herein as a computer program product or program storage device. This includes, but is not limited to, computer 2300, main memory 2308, secondary storage devices 2310, and removable storage unit 2316. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media and signals transmitted over wired media. Embodiments are also directed to such communication media.

The techniques and embodiments described herein may be implemented as, or in, various types of devices. For instance, embodiments may be included in mobile devices such as laptop computers, handheld devices such as mobile phones (e.g., cellular and smart phones), handheld computers, and further types of mobile devices, desktop and/or server computers. A device, as defined herein, is a machine or manufacture as defined by 35 U.S.C. § 101. Devices may include digital circuits, analog circuits, or a combination thereof. Devices may include one or more processor circuits (e.g., central processing units (CPUs) (e.g., processor 2306 of FIG. 23), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VI. Further Example Embodiments

A method is described herein. The method comprises: statically analyzing an image file to obtain characteristics of the image file; receiving runtime characteristics of a computing process of an application executing on a compute instance, the application corresponding to the image file; comparing the characteristics of the image file to the runtime characteristics of the computing process to determine discrepancies therebetween; and responsive to determining the discrepancies: determining that the computing process has been compromised with malicious code; and performing one or more actions to mitigate the malicious code.

In one embodiment of the foregoing method, statically analyzing the image file to obtain the characteristics of the image file comprises: analyzing at least one or more of a header section, a code segment, or a data segment of the image file to determine the characteristics of the image file.

In one embodiment of the foregoing method, the characteristics of the image file include one or more of: one or more libraries that are dynamically-linkable during execution of the application; one or more modules that are associated with at least one of a particular runtime or scripting language; one or more packages included in the image file; one or more files included in the image file; one or more classes that are loadable during execution of the application; one or more commands that are executable during execution of the application; one or more domain name server (DNS) addresses that are resolvable during execution of the application; one or more class loaders that are configured to load the one or more classes or; information associated with a virtual dynamic shared object (VDSO) file.

In one embodiment of the foregoing method, the statically analyzing the image file to obtain characteristics of the image file comprises: generating a control flow graph based on the image file that is representative of a control flow during execution of the application; analyzing the control flow graph to determine one or more predetermined function calls represented by the control flow graph, the one or more predetermined function calls comprising at least one of a function call configured to load a class, a function call configured to execute a command, or a function call configured to resolve a DNS address; and determining one or more string inputs to the one or more predetermined function calls, the one or more string inputs corresponding to at least one or more of the one or more classes that are loadable during execution of the application, the one or more commands that are executable during execution of the application, or the one or more DNS addresses that are resolvable during execution of the application.

In one embodiment of the foregoing method, receiving the runtime characteristics of the computing process of the application executing on the compute instance comprises: receiving a first identification of one or more classes that are loaded into a memory allocated for the computing process, one or more commands that are executed during execution of the application, or one or more DNS addresses that resolved during execution of the application.

In one embodiment of the foregoing method, the method further comprises: comparing the characteristics of the image file to the runtime characteristics of the computing process to determine the discrepancies therebetween comprises: receiving a second identification of one or more classes that are loadable into a memory allocated for the computing process, one or more commands that are executable during execution of the application, or one or more DNS addresses that resolvable during execution of the application, the second identification being determined based on said statically analyzing; and determining whether the first identification matches the second identification; and wherein determining that the computing process has been compromised with malicious code comprises: in response to determining that the first identification does not match the second identification, determining that the computing process has been compromised.

In one embodiment of the foregoing method, receiving the runtime characteristics of the computing process of the application executing on the compute instance comprises: receiving a bitmap representing pages that are loaded into a memory allocated for the computing process and that store executable segments of the computing process; and receiving a first hash representative of the executable segments.

In one embodiment of the foregoing method, the method further comprises: comparing the characteristics of the image file to the runtime characteristics of the computing process to determine the discrepancies therebetween comprises: retrieving data from portions of a code segment of the image file, the portions being determined based on the bitmap and corresponding to the pages; generating a second hash representative of the data retrieved from the portions of the code segment; and determining whether the first hash is equal to the second hash; and wherein determining that the computing process has been compromised with malicious code comprises: in response to determining that the first hash is not equal to the second hash, determining that the computing process has been compromised.

In one embodiment of the foregoing method, receiving the runtime characteristics of the computing process of the application executing on the compute instance comprises: receiving at least one first hash representative of at least one of files, packages or scripts that are loaded into a memory allocated for the computing process.

In one embodiment of the foregoing method, comparing the characteristics of the image file to the runtime characteristics of the computing process to determine the discrepancies therebetween comprises: generating at least one second hash representative of at least one of files, packages, or scripts included in the image file; and determining whether the at least one first hash is equal to the at least one second hash; and wherein determining that the computing process has been compromised with malicious code comprises: in response to determining that the at least one first hash is not equal to the at least one second hash, determining that the computing process has been compromised.

In one embodiment of the foregoing method, the compute instance comprises at least one of: a server; a virtual machine executing on the server; a computing node in a cloud-based environment; or an Internet-of-Things (IoT) device.

In one embodiment of the foregoing method, performing the one or more actions to mitigate the malicious code comprises: providing a notification to a user; stopping at least one of the computing process or the compute instance; suspending at least one of the computing process or the compute instance; or restarting at least one of the computing process or the compute instance.

A system is also described herein. The system includes at least one processor circuit; and at least one memory that stores program code configured to be executed by the at least one processor circuit, the program code comprising: a notary configured to statically analyze an image file to obtain characteristics of the image file; a validator configured to: receive runtime characteristics of a computing process of an application executing on a compute instance, the application corresponding to the image file; compare the characteristics of the image file to the runtime characteristics of the computing process to determine discrepancies therebetween; and responsive to determining the discrepancies, determine that the computing process has been compromised with malicious code; and a mitigator configured to perform one or more actions to mitigate the malicious code.

In one embodiment of the foregoing system, the notary is configured to: analyze at least one or more of a header section, a code segment, or a data segment of the image file to determine the characteristics of the image file. In one embodiment of the foregoing system, the characteristics of the image file include one or more of: one or more libraries that are dynamically-linkable during execution of the application; one or more modules that are associated with at least one of a particular runtime or scripting language; one or more packages included in the image file; one or more files included in the image file; one or more classes that are loadable during execution of the application; one or more commands that are executable during execution of the application; one or more domain name server (DNS) addresses that are resolvable during execution of the application; one or more class loaders that are configured to load the one or more classes or; information associated with a virtual dynamic shared object (VDSO) file.

In one embodiment of the foregoing system, the compute instance comprises at least one of: a server; a virtual machine executing on the server; a computing node in a cloud-based environment; or an Internet-of-Things (IoT) device.

A computer-readable storage medium having program instructions recorded thereon that, when executed by at least one processor of a computing device, perform a method. The method comprises: statically analyzing an image file to obtain characteristics of the image file; receiving runtime characteristics of a computing process of an application executing on a compute instance, the application corresponding to the image file; comparing the characteristics of the image file to the runtime characteristics of the computing process to determine discrepancies therebetween; and responsive to determining the discrepancies: determining that the computing process has been compromised with malicious code; and performing one or more actions to mitigate the malicious code.

In one embodiment of the foregoing computer-readable storage medium, statically analyzing the image file to obtain the characteristics of the image file comprises: analyzing at least one or more of a header section, a code segment, or a data segment of the image file to determine the characteristics of the image file.

In one embodiment of the foregoing computer-readable storage medium, the characteristics of the image file include one or more of: one or more libraries that are dynamically-linkable during execution of the application; one or more modules that are associated with at least one of a particular runtime or scripting language; one or more packages included in the image file; one or more files included in the image file; one or more classes that are loadable during execution of the application; one or more commands that are executable during execution of the application; one or more domain name server (DNS) addresses that are resolvable during execution of the application; one or more class loaders that are configured to load the one or more classes or; information associated with a virtual dynamic shared object (VDSO) file.

In one embodiment of the foregoing computer-readable storage medium, the compute instance comprises at least one of: a server; a virtual machine executing on the server; a computing node in a cloud-based environment; or an Internet-of-Things (IoT) device.

VII. Example Embodiments

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method for determining whether an application has been compromised by malicious code, the method comprising:
    obtaining an image corresponding to the application, the image including one or more binaries, one or more scripts, one or more configurations, executable program code of the application and/or one or more dependencies necessary for execution of the application;
    statically analyzing the image file to obtain characteristics of the image file, the characteristics of the image file including at least one of: one or more packages included in the image file, one or more files included in the image file, or one or more commands that are to be executed during runtime of the application;
    mapping the image into a memory space of a compute instance allocated for the application to create an executable instance of the application;
    receiving runtime characteristics of the executable instance of the application executing on the compute instance, the runtime characteristics including at least one of: one or more packages loaded into a memory space allocated for the application, one or more files loaded into the memory space allocated for the application, or one or more commands executed by the application, wherein the runtime characteristics further comprise a bitmap representing pages that are loaded into the memory space allocated for application and that store executable segments of the application, and a first hash representative of executable segments of the application;
    comparing the characteristics of the image file to the runtime characteristics of the executable instance of the application to determine discrepancies between at least one of: the one or more packages-included in the image file and the one or more packages loaded into the memory space allocated for the application, the one or more files included in the image file and the one or more files loaded into the memory space allocated for the application, or the one or more commands that are to be executed during runtime of the application and the one or more commands executed by the application, wherein the comparing comprises:
        retrieving data from portions of a code segment of the image file, the portions being determined based on the bitmap and corresponding to the pages;
        generating a second hash representative of the data retrieved from the portions of the code segment; and
        determining whether the first hash is equal to the second hash; and
    responsive to determining the discrepancies:
        determining, in response to determining that the first hash is not equal to the second hash, that the executable instance of the application has been compromised with malicious code; and
        performing one or more actions to mitigate the malicious code.

2. The method of claim 1, wherein statically analyzing the image file to obtain the characteristics of the image file comprises:
    analyzing at least one or more of a header section, a code segment, or a data segment of the image file to determine the characteristics of the image file.

3. The method of claim 1, wherein the characteristics of the image file further include one or more of:
    one or more libraries that are dynamically-linkable during execution of the application;
    one or more modules that are associated with at least one of a particular runtime or scripting language;
    one or more classes that are loadable during execution of the application;
    one or more domain name server (DNS) addresses that are resolvable during execution of the application;
    one or more class loaders that are configured to load the one or more classes; or
    information associated with a virtual dynamic shared object (VDSO) file.

4. The method of claim 3, wherein statically analyzing the image file to obtain characteristics of the image file comprises:
    generating a control flow graph based on the image file that is representative of a control flow during execution of the application;
    analyzing the control flow graph to determine one or more predetermined function calls represented by the control flow graph, the one or more predetermined function calls comprising at least one of a function call configured to load a class, a function call configured to execute a command, or a function call configured to resolve a DNS address; and
    determining one or more string inputs to the one or more predetermined function calls, the one or more string inputs corresponding to at least one or more of the one or more classes that are loadable during execution of the application, the one or more commands that are executable during execution of the application, or the one or more DNS addresses that are resolvable during execution of the application.

5. The method of claim 1, wherein receiving the runtime characteristics of the executable instance of the application executing on the compute instance comprises:
   receiving a first identification of one or more classes that are loaded into the memory space allocated for the application or one or more DNS addresses that resolved during execution of the application.

6. The method of claim 5, further comprising comparing the characteristics of the image file to the runtime characteristics of the executable instance of the application to determine discrepancies therebetween, wherein said comparing comprises:
   receiving a second identification of one or more classes that are loadable into the memory allocated for the application, one or more commands that are executable during execution of the application, or one or more DNS addresses that are resolvable during execution of the application, the second identification being determined based on said statically analyzing; and
   determining whether the first identification matches the second identification; and
   determining that the executable instance of the application has been compromised with malicious code in response to determining that the first identification does not match the second identification.

7. The method of claim 1, wherein receiving the runtime characteristics of the executable instance of the of the application executing on the compute instance comprises:
   receiving at least one first hash representative of the one or more files or the one or more packages that are loaded into the memory allocated for the application.

8. The method of claim 7, further comprising comparing the characteristics of the image file to the runtime characteristics of the executable instance of the application to determine discrepancies therebetween, wherein said comparing comprises:
   generating at least one second hash representative of the one or more files or the one or more packages included in the image file; and
   determining whether the at least one first hash is equal to the at least one second hash; and
   determining that the executable instance of the application has been compromised with malicious code in response to determining that the at least one first hash is not equal to the at least one second hash.

9. The method of claim 1, wherein the compute instance comprises at least one of:
   a server;
   a virtual machine executing on the server;
   a computing node in a cloud-based environment; or
   an Internet-of-Things (IoT) device.

10. The method of claim 1, wherein performing the one or more actions to mitigate the malicious code comprises:
    providing a notification to a user;
    stopping at least one of the executable instance of the application or the compute instance;
    suspending at least one of the executable instance of the application or the compute instance; or
    restarting at least one of the executable instance of the application or the compute instance.

11. A system, comprising:
    at least one processor; and
    at least one memory that stores program code configured to be executed by the at least one processor, the program code comprising:
       a notary configured to obtain an image corresponding to an application, the image including one or more binaries, one or more scripts, one or more configurations, executable program code of the application and/or one or more dependencies necessary for execution of the application, the notary further configured to statically analyze the image file to obtain characteristics of the image file, the characteristics of the image file including at least one of: one or more packages included in the image file, one or more files included in the image file, or one or more commands that are to be executed during runtime of the application;
       a validator configured to:
          receive runtime characteristics of an executable instance of the application executing on a compute instance, the application having been instantiated by mapping the image into a memory space of a compute instance allocated for the application to create an executable instance of the application, wherein the runtime characteristics include at least one of: one or more packages loaded into a memory space allocated for the application, one or more files loaded into the memory space allocated for the application, or one or more commands executed by the application, wherein the runtime characteristics further comprise a bitmap representing pages that are loaded into the memory space allocated for application and that store executable segments of the application, and a first hash representative of executable segments of the application; and
          compare the characteristics of the image file to the runtime characteristics of the executable instance of the application to determine discrepancies between at least one of: the one or more packages included in the image file and the one or more packages loaded into the memory space allocated for the application, the one or more files included in the image file and the one or more files loaded into the memory space allocated for the application, or the one or more commands that are to be executed during runtime of the application and the one or more commands executed by the application, wherein the comparing comprises:
             retrieving data from portions of a code segment of the image file, the portions being determined based on the bitmap and corresponding to the pages;
             generating a second hash representative of the data retrieved from the portions of the code segment; and
             determining whether the first hash is equal to the second hash; and
       a mitigator configured to, responsive to determining that the first hash is not equal to the second hash, determine that the executable instance of the application has been compromised with malicious code and perform one or more actions to mitigate the malicious code.

12. The system of claim 11, wherein the notary is configured to:
- analyze at least one or more of a header section, a code segment, or a data segment of the image file to determine the characteristics of the image file.

13. The system of claim 11, wherein the characteristics of the image file further include one or more of:
- one or more libraries that are dynamically-linkable during execution of the application;
- one or more modules that are associated with at least one of a particular runtime or scripting language;
- one or more classes that are loadable during execution of the application;
- one or more domain name server (DNS) addresses that are resolvable during execution of the application;
- one or more class loaders that are configured to load the one or more classes; or information associated with a virtual dynamic shared object (VDSO) file.

14. The system of claim 13, wherein the compute instance comprises at least one of:
- a server;
- a virtual machine executing on the server;
- a computing node in a cloud-based environment; or
- an Internet-of-Things (IoT) device.

15. A non-transitory computer-readable storage medium having program instructions recorded thereon that, when executed by at least one processor, perform a method for determining whether an application has been compromised by malicious code, the method comprising:
- obtaining an image corresponding to the application, the image including one or more binaries, one or more scripts, one or more configurations, executable program code of the application and/or one or more dependencies necessary for execution of the application;
- statically analyzing the image file to obtain characteristics of the image file, the characteristics of the image file including at least one of: one or more packages included in the image file, one or more files included in the image file, or one or more commands that are to be executed during runtime of the application;
- mapping the image into a memory space of a compute instance allocated for the application to create an executable instance of the application;
- receiving runtime characteristics of the executable instance of the application executing on the compute instance, the runtime characteristics including at least one of: one or more packages loaded into a memory space allocated for the application, one or more files loaded into the memory space allocated for the application, or one or more commands executed by the application, wherein the runtime characteristics further comprise a bitmap representing pages that are loaded into the memory space allocated for application and that store executable segments of the application, and a first hash representative of executable segments of the application;
- comparing the characteristics of the image file to the runtime characteristics of the executable instance of the application to determine discrepancies between at least one of: the one or more packages-included in the image file and the one or more packages loaded into the memory space allocated for the application, the one or more files included in the image file and the one or more files loaded into the memory space allocated for the application, or the one or more commands that are to be executed during runtime of the application and the one or more commands executed by the application, wherein the comparing comprises:
  - retrieving data from portions of a code segment of the image file, the portions being determined based on the bitmap and corresponding to the pages;
  - generating a second hash representative of the data retrieved from the portions of the code segment; and
  - determining whether the first hash is equal to the second hash; and
- responsive to determining the discrepancies:
  - determining, in response to determining that the first hash is not equal to the second hash, that the executable instance of the application has been compromised with malicious code; and
  - performing one or more actions to mitigate the malicious code.

16. The non-transitory computer-readable storage medium of claim 15, wherein statically analyzing the image file to obtain the characteristics of the image file comprises:
- analyzing at least one or more of a header section, a code segment, or a data segment of the image file to determine the characteristics of the image file.

17. The non-transitory computer-readable storage medium of claim 15, wherein the characteristics of the image file further include one or more of:
- one or more libraries that are dynamically-linkable during execution of the application;
- one or more modules that are associated with at least one of a particular runtime or scripting language;
- one or more classes that are loadable during execution of the application;
- one or more domain name server (DNS) addresses that are resolvable during execution of the application;
- one or more class loaders that are configured to load the one or more classes; or information associated with a virtual dynamic shared object (VDSO) file.

18. The non-transitory computer-readable storage medium of claim 15, wherein the compute instance comprises at least one of:
- a server;
- a virtual machine executing on the server;
- a computing node in a cloud-based environment; or
- an Internet-of-Things (IoT) device.

19. The method of claim 1, wherein receiving the runtime characteristics comprises:
- receiving, from the compute instance via a network, the runtime characteristics.

20. The method of claim 1, further comprising:
- identifying vulnerabilities of the compute instance based on the characteristics of the image file; and
- responsive to identifying the vulnerabilities, performing one or more second actions to mitigate the vulnerabilities.

* * * * *

UNITED STATES PATENT AND TRADEMARK OFFICE
CERTIFICATE OF CORRECTION

| | | |
|---|---|---|
| PATENT NO. | : 12,367,281 B2 | Page 1 of 1 |
| APPLICATION NO. | : 17/426294 | |
| DATED | : July 22, 2025 | |
| INVENTOR(S) | : Boutnaru et al. | |

It is certified that error appears in the above-identified patent and that said Letters Patent is hereby corrected as shown below:

In the Claims

In Column 41, in Claim 7, Line 31, delete "of the of the" and insert -- of the --, therefor.

In Column 43, in Claim 14, Line 19, delete "claim 13," and insert -- claim 11, --, therefor.

Signed and Sealed this
Thirtieth Day of September, 2025

John A. Squires
*Director of the United States Patent and Trademark Office*